(12) United States Patent
Bland et al.

(10) Patent No.: US 7,686,107 B1
(45) Date of Patent: Mar. 30, 2010

(54) ZERO-TURN RADIUS VEHICLE WITH STEERABLE FRONT WHEELS

(75) Inventors: Mark Charles Bland, New Albany, IN (US); Jeffery A. Huncilman, New Albany, IN (US)

(73) Assignee: Gizmow LLC, New Albany, IN (US)

( * ) Notice: Subject to any disclaimer, the term of this patent is extended or adjusted under 35 U.S.C. 154(b) by 0 days.

(21) Appl. No.: 11/754,652

(22) Filed: May 29, 2007

Related U.S. Application Data

(63) Continuation of application No. 10/968,758, filed on Oct. 15, 2004, now Pat. No. 7,237,629.

(60) Provisional application No. 60/511,529, filed on Oct. 15, 2003.

(51) Int. Cl.
*B60K 17/34* (2006.01)
*B62D 3/02* (2006.01)

(52) U.S. Cl. .................. 180/6.24; 180/6.26; 180/6.3; 56/14.7

(58) Field of Classification Search .............. 180/6.24, 180/6.26, 6.3; 56/14.7
See application file for complete search history.

(56) References Cited

U.S. PATENT DOCUMENTS

| | | | |
|---|---|---|---|
| 3,154,164 A | 10/1964 | Shaw et al. | |
| 3,382,653 A | 5/1968 | Buigne | |
| 4,504,074 A | 3/1985 | Smith | |
| 4,759,417 A | 7/1988 | Wanie et al. | |
| 4,883,137 A | 11/1989 | Wanie et al. | |
| 4,957,183 A * | 9/1990 | Mullett et al. | 180/234 |
| 5,042,238 A * | 8/1991 | White et al. | 56/11.8 |
| 5,484,030 A | 1/1996 | Glenn | |
| 6,185,920 B1 | 2/2001 | Oxley | |
| 6,341,479 B1 | 1/2002 | Scag et al. | |
| 6,354,388 B1 * | 3/2002 | Teal et al. | 180/6.2 |
| 6,484,827 B2 * | 11/2002 | Teal et al. | 180/6.2 |
| 6,601,663 B2 | 8/2003 | Hauser | |
| 6,758,290 B2 | 7/2004 | Jolliff et al. | |
| 6,904,985 B2 * | 6/2005 | Ferree et al. | 180/6.32 |
| 6,962,219 B2 | 11/2005 | Hauser | |
| 7,044,244 B2 * | 5/2006 | Irikura | 180/6.26 |
| 7,108,096 B1 * | 9/2006 | Oxley et al. | 180/197 |
| 2003/0019682 A1 * | 1/2003 | Schaedler et al. | 180/308 |

* cited by examiner

*Primary Examiner*—Lesley Morris
*Assistant Examiner*—Marlon A Arce
(74) *Attorney, Agent, or Firm*—Eric Killmeier; Robert Eichenberger; Middleton Reutlinger

(57) ABSTRACT

The present invention relates to a zero turning radius vehicle having at least one steerable front wheel and a multistage steering input system separately capable of steering the at least one front wheel and selectively driving the drive wheels. A front wheel steering system comprises at least one oblongated sprocket meshingly connected to a steering shaft. An engagement cam system provides the ability to selectively, independently couple the steering wheel to pump arms driving a first and second drive wheel. A steering cam shaft comprises at least one steering cam that acts on at least one bearing. Once the engagement cam system rotates the at least one bearing into place to receive the at least one steering cam, rotation of the steering cam independently alters the speed of one drive wheel in relation to the other drive wheel in response to steering input provided by the operator.

15 Claims, 37 Drawing Sheets

ZERO-TURN RADIUS VEHICLE WITH STEERABLE FRONT WHEELS

CROSS REFERENCE TO RELATED APPLICATIONS

This patent application is a continuation of, currently pending, U.S. patent application Ser. No. 10/968,758, entitled Zero-turn Radius Vehicle with Steerable Front Wheels", filed on Oct. 15, 2004, which claims priority (under 35 USC §119 (e)) to U.S. Provisional Application Ser. No. 60/511,529, filed on Oct. 15, 2003 titled "Zero-turn radius lawnmower with steerable front wheels."

BACKGROUND OF THE INVENTION

1. Field of the Invention

The present invention relates generally to a zero turning radius vehicle. Specifically, the present invention provides a zero turning radius vehicle with outboard steerable front wheels and independently-driven rear wheels.

2. Background

Whether a lawn mower is utilized commercially or for personal use, efficient operation is essential. In commercial settings, time is money and contractors desire to finish a yard as quickly as possible so they may complete more jobs in a day. Similarly, a homeowner wants to finish his yard as soon as possible so that he may move on to more enjoyable activities. Zero-turning-radius ("ZTR") vehicles adapted to include a mower deck have become particularly popular in the lawn care industry because their tight cornering capability obviates the constant need to shift gears from forward to reverse or to drive in a wide loop in order to turn around, as is necessitated by the large turning radius of a non-ZTR vehicle.

Zero turning radius vehicles known in the art have the capability to make turns having a center of rotation at the midpoint between the independent drive wheels. This is accomplished by driving the independent drive wheels at different speeds, and even in different directions, with respect to each other. ZTR vehicles are particularly useful in the lawn care industry. ZTR vehicles require the operator to facilitate steering of the vehicle by maneuvering separate levers responsible for controlling the independent drives of each wheel rather than providing a steering wheel. However, many users find the dual lever system extremely difficult to operate given that the vast majority of vehicles with which the average person is familiar utilizes a steering wheel as the steering input. The dual-lever systems typically involve a very lengthy "learning curve" to enable the user to become accustomed to its operation.

In commonly known ZTR vehicles, the drive wheels, or locomotion wheels are the rear wheels. These rear ground-engaging, independent drive wheels also provide the means of steering the vehicle. As a result, it is not necessary for the front wheels to be steerable. Therefore, caster wheels are typically used for the front ground-engaging wheels. Caster wheels spin 360 degrees about a vertical axis of rotation, but are not steered. Rather, they simply respond to the movement and direction of the vehicle as dictated by the drive wheels.

The problem with these non-steerable front wheels, however, is that "crabbing" is a major problem. For example, when a ZTR vehicle using non-steerable caster wheels as front ground-engaging wheels is driven laterally across the side of a hill, the gravitational force of the lawn mower tends to pull the vehicle down the side of the hill. The natural tendency of the caster wheels is to turn down the hill even if the operator does not wish to turn in that direction. To counteract this phenomenon, users of common ZTR vehicles must continually provide intermittent steering inputs with the levers to maintain the ZTR vehicle on the hill. The result is a series of zigzag motions (or "crabbing") as the vehicle traverses the hill or an angling of the vehicle as it moves across the hillside.

In systems that purport to "steer" the front wheels, the front wheels are simply linked at all times to the drive wheels so that some amount of "bias" is always present. "Bias" in this context refers to a situation where the rear drive wheels are being operated at differing speeds and/or direction from each other. Moreover, the steering wheel in such systems is used at all times as an accelerator. Every steering input provides bias to the drive wheels. There is no mechanism allowing the steering wheel to not be used as a biasing accelerator. This would appear to cause major problems for the user. First, it could be difficult to control the vehicle since any steering input is automatically translated into a bias condition. Second, constantly biasing the drive wheels could create the need for constant steering inputs, always correcting and counter-correcting for each previous steering input. Linear lines of travel could be difficult, if not impossible, to achieve. Moreover, constantly biasing the rear wheels could tear up the turf.

The need exists for a ZTR vehicle that can actually steer the front wheels of the vehicle separate from the drive wheels in order to provide more efficient and effective operation and reduce or eliminate the crabbing phenomenon. The need also exists for a ZTR vehicle that is more user-friendly so that a consumer need not spend an inordinate amount of time learning how to operate the vehicle. Also, the need exists for a ZTR vehicle that provides a multistage steering input to steerable front wheels and to drive wheels in a predetermined relationship to eliminate the constant bias in the drive wheels, thus providing a much more natural vehicle similar to other steered-wheel vehicles in use.

BRIEF SUMMARY OF THE INVENTION

The present invention is directed to a ZTR vehicle providing steerable front ground-engaging wheels. The vehicle comprises a frame that includes a first and second steerable rotatably-mounted front ground-engaging wheel and two rotatably-mounted ground-engaging drive wheels. It is noted that at least one steerable front wheel is all that is required. However, two steerable front wheels are typical of these vehicles and so the discussion will describe an apparatus having two steerable front wheels. This shall not, however, be deemed to limit the invention to requiring two steerable front wheels. The first and second steerable front wheels are connected to the frame via wheel yokes and caster pivot mounts. The frame further includes an engine that provides power to operate the vehicle and two hydraulic pumps, each pump independently connected to one drive wheel.

A steering system is provided through which a multistage steering input can be provided to the vehicle. In the preferred embodiment, the steering system comprises a steering device that is a steering wheel rotatable in clockwise and counter-clockwise directions. Obviously, however, any form of steering device (dual levers, single levers, joysticks, and so forth) is possible. The steering device provides a multistage steering input to multiple systems of the vehicle. In the preferred embodiment, the steering input provides input in two stages—a first input to a front wheel steering system and a second input to a drive wheel locomotion system in a manner that selectively alters the speed of one drive wheel in relation to the other. The steering system does not always engage the drive wheel locomotion system. Rather, it can selectively engage it through the use of an engagement cam system.

In the front wheel steering system, the steering device is connected by one or more steering shafts to at least one wheel sprocket. Again, for the sake of convenience, a vehicle having two front wheels is described, and so the discussion involves a first and second wheel sprocket. This shall not be deemed to limit the invention to requiring two wheel sprockets. The first and second wheel sprockets are connected to the caster pivot mounts of the first and second steerable front wheels, respectively. Preferably the wheel sprockets are ellipsoidal, ovoidal, oblong, or of any similar regular or non-regular geometric shape having at least two rounded sides separated by a first axis and at least two sides separated by a second axis. In the preferred embodiment, the first axis (a major axis) is greater than the second axis (a minor axis). Sprockets having such design are termed, collectively, as being "oblongated". Such specially designed sprockets are needed in order to provide proper turning of the steerable wheels, to ensure the steerable wheels rotate during the turn instead of drag across the turf, and to keep proper tension in the chains. This is possible because the oblongated sprockets provide an unmatched radius of rotation about the center of the drive wheel axis for one steerable front wheel with respect to the other steerable front wheel. This provides an asynchronously steered system and is not possible with standard circular sprockets. Rotating the steering wheel in turn rotates the steering shaft via one or more chains that meshingly engage the first and second wheel sprockets. The oblongated wheel sprockets rotate the first and second steerable front wheels in a manner that provides true zero-radius turning capability without ploughing or scraping the turf.

Thus, when the steering input is engaged in a particular direction, the steering shaft rotates in a like fashion. That rotation is translated to the wheel sprockets via one or more chains, causing the front ground-engaging wheels to pivot in an amount proportional to the rotation of the steering device. Other structures such as belts, cables, and the like are also possible to translate the rotation from the steering shaft to the ground-engaging wheels. Preferably, one or more idler sprockets is pivotally attached to opposing sides of the frame near the front of the vehicle. One or more of the idler sprockets meshingly engages the left chain, while the other idler sprockets meshingly engage the right chain. One purpose of the idler sprockets may be to tension the chain, assisting in the turning of the front wheels. Another purpose may be to provide a means to adjust the steering system for proper wheel alignment and function.

A drive wheel locomotion system is provided that links a forward input (e.g., a pedal) and a reverse input (e.g., a pedal) to each of the ground-engaging drive wheels. The drive wheels are independently driven by separate drive units connected to first and second hydrostatic pumps. Each pump has a pump arm that is connected to a swash plate internal to the pump. The pump arms are rotatable in both a forward and a backward direction in amounts that correlate to varying speeds provided by the user via the forward input and the reverse input.

A pump forward control assembly provides the linkage between the forward input and the pump arms to rotate the pump arms in a forward direction to drive the drive wheels forward. However, even though the drive wheels are capable of being independently driven, the pump forward control assembly links the forward input to the drive wheels in a combined fashion. That is, the pump forward control assembly moves the pump arms in equal amounts. It does not, by itself, allow the forward input to independently drive the drive wheels. The ability to drive the drive wheels independently is provided by a cam engagement system, described below.

The reverse input is also linked to the pump forward control assembly, but in a manner such that movement of the reverse input rotates the pump arms of the first and second pumps in a backward direction. This has the effect of driving the drive wheels in a reverse direction in equal amounts. The reverse input, similar to the forward input, cannot by itself drive one drive wheel at a different speed than the other drive wheel. The forward and reverse inputs may comprise forward and reverse pedals, as described, but need not be separate pedals. In fact, the forward and reverse inputs may comprise a single pedal, lever, or other mechanism that moves in first and second directions.

As described, each drive unit may comprise a hydrostatic motor and a hydrostatic pump. Each hydrostatic motor may include an output shaft which is coupled with a first or second of the rear ground-engaging wheels, respectively, such that each rear wheel may be independently driven via the cam engagement system. In this manner, by allowing the rear wheels to drive at different speeds relative to each other, the present invention possesses very tight cornering capability, and can even achieve a zero radius turning. The ability to drive the drive wheels at different speeds relative to each other is linked to the front wheel steering system via the cam engagement system.

The front wheel steering system, described above, steers the front wheels in a first stage of steering. However, through the use of the cam engagement system, the front wheel steering system also comprises a second stage of steering that provides the ability to drive the drive wheels at different speeds with respect to each other.

In the second stage the steering wheel is coupled to the drive wheel locomotion system in a manner that allows the power applied to one or the other of the rear wheels to be altered in response to steering input when the vehicle is operated in a forward direction. Which of the drive wheels is slowed depends on the direction of steering input. The engagement cam system comprises an engagement cam shaft that is rotatable forward from a first position via linkage to the forward input.

The engagement cam system further comprises at least one cam follower that moves forward during rotation of the engagement cam shaft. The at least one cam follower can also employ at least one bearing thereon for receiving contact by a steering cam (described below). Again, however, for the sake of convenience, the description discusses a first cam follower having a first bearing thereon for meeting a first steering cam, and a second cam follower having a second bearing thereon for meeting a second steering cam. This shall not be deemed to limit the invention to requiring two cam followers, two bearings, and two steering cams. The first and second cam followers further comprise first and second bearings that receive contact by first and second steering cams (described below). When the engagement cam shaft is rotated sufficiently, this places the first and second bearings in position to make independent contact with the first and second steering cams. The first and second cam followers are independently rotatable in a rearward direction via the contact made by the first and second steering cams and the first and second bearings, respectively. The first cam follower is connected to the pump arm of the first pump (associated with the first drive wheel) via a first push cable. The second cam follower is connected to the pump arm of the second pump (associated with the second drive wheel) via a second push cable. Again, the discussion of a first and second push cable is for convenience. A single push cable could also be utilized.

In this second stage of steering, the steering shaft further comprises a steering cam shaft having thereon at least one steering cam. Again, for the sake of convenience, the discussion describes a first and second steering cam. This shall not be deemed to limit the invention to requiring two steering cams. The first and second steering cams have a perimeter or a portion of a perimeter that increases in radius in a given circumferential direction. A single steering cam embodiment would contain portions of a perimeter that increase in radius in two given circumferential directions. The rate of the increasing radius of the outer surface or perimeter of the steering cams can vary in any generally curvate relationship. The outer surface can contain portions that are spiral, parabolic, elliptical, or of any conic section or other curvate non-circular geometry. The only requirement is that each point along the perimeter in a given circumferential direction is located at a greater distance than the previous point.

When the forward input is depressed, as stated, the linkage rotates the engagement cam shaft forward, which moves the first and second cam followers forward such that the first and second bearings are now in a receiving position. In this receiving position, if the user provides a steering input, the steering cam shaft rotates. If the steering input is a left turn, the first steering cam begins to rotate about its axis of rotation, and when it does it brings its increasing radius into contact with the first bearing. As more steering input is applied, more of the increasing radius of the first steering cam contacts the first bearing, forcing the first bearing and the first cam follower in an increasingly backward direction. Because the first cam follower is connected to the first end of the first push cable, the backward direction of the cam follower provides a compressive force (a "push") onto the pump arm of the first pump associated with the first (inside) drive wheel. This has the effect of slowing the inside drive wheel in proportion to the left steering input.

In similar fashion, if the steering input is a right turn, the second steering cam begins to rotate about its axis of rotation, and when it does it brings its increasing radius into contact with the second bearing. As more steering input is applied, more of the increasing radius of the second steering cam contacts the second bearing, forcing the second bearing and the second cam follower in an increasingly backward direction. Because the second cam follower is connected to a first end of the second push cable, the backward direction of the cam follower provides a compressive force (a "push") onto the pump arm of the second pump associated with the second (inside) drive wheel. This has the effect of slowing the inside drive wheel in proportion to the right steering input.

In this embodiment, the reverse input is not connected to the first and second cam followers. This means that when the reverse input is engaged and the vehicle is operated in reverse, if the operator turns the steering device, the rear wheel steering mechanism will not operate to alter the amount of power applied to either wheel. Therefore, when the reverse input is engaged and the vehicle is operated in reverse, the steerable front wheels are the only means of steering the vehicle.

Optionally, the invention comprises an automatic self-catching seat latch for use with or without roll-over protection systems ("ROPS"). The increasing use of ROPS systems provides additional safety features for the operator of such vehicles. However, one requirement of ROPS systems is the inclusion of a positive seat latch mechanism that locks the seat to the frame. Many varieties of seat latch systems are found in the art, but a majority of these systems utilize components welded directly to a seat mount or to the frame. The welded structure creates at least two significant problems. First, if the welds break, the entire seat mount must be removed in order for the latch to be repaired or replaced. This costs the user significant dollars and significant time to repair. Second, because of the welded structure, no adjustability is designed into the latch. Therefore, upon lengthy use and normal wear and tear, the latch mechanisms may become less effective due to movement of the components over time. An optional adjustable removable seat latch system is provided in the preferred embodiment to eliminate these problems.

The adjustable removable seat latch system comprises at least a first latch having an activation portion and a catch portion. The latch is pivotable about a shaft that is preferably spring-loaded into a "latch" position. The catch portion further comprises an angled section opposite the activation portion, a groove for engaging a sturdy portion of the vehicle (for example, the frame), and an adjustment block for adjustability in horizontal and vertical directions. To expose the underside of the seat, the user depresses the activation portion, rotating it against the spring force to move the groove out of an interlocking relationship with the sturdy portion of the vehicle. To close the seat, the user simply lets the seat drop, which brings the angled section of the latch into engagement with the sturdy portion of the vehicle. As the seat continues to move downward under its own weight, the angled section continues to move along the sturdy portion of the vehicle, and the latch begins to rotate against the spring force. As the seat reaches its final destination, it brings the groove into interlocking engagement with the sturdy portion of the vehicle, and the spring snaps into locking position. The seat is now automatically locked. Adjustability is provided with the adjustment block.

Optionally, the apparatus can also include a cruise control system to allow the user to remove his/her foot from the forward pedal, thereby reducing user fatigue during long mowing operations. The cruise control system comprises a cruise control shaft having a cruise control link operatively connected to a handle. The cruise control link connects to the forward control shaft that in turn connects to the pump forward control assembly. Thus, when the user moves the handle to engage the cruise control system, the cruise control shaft rotates the cruise control link into engagement with the forward control shaft, which moves the pump forward control assembly forward, moving the pump arms of the pumps forward in an equal amount. A catch is provided for the handle so that the user can select and maintain the desired amount of ground speed for the cruise control.

The present invention therefore provides a ZTR vehicle having a means for steering at least one steerable front wheel; a means for coupling the independent drive wheels for driving at equal speeds and directions; and a means for selectively de-coupling the independent drive wheels in order to drive them at unequal speeds and/or unequal directions.

The present invention further provides a two-stage steering assembly for a zero-turn radius vehicle having at least one steerable front wheel operatively coupled to a steering input and at least two independently driven drive wheels, wherein the two-stage steering assembly further comprises at least one steering cam operatively coupled to the steering input. The at least one steering cam further comprises a surface for selectively coupling with at least one cam follower, wherein the at least one cam follower is coupled with the at least two independently driven drive wheels for providing unequal locomotive power to the at least two independently driven drive wheels. At least one oblongated wheel sprocket is operatively connected to the steering input and to the at least one steerable front wheel for translating the steering input into a steering direction of the at least one steerable front wheel.

The present invention further provides a method for separating a steering input of a vehicle having independently driven drive wheels into a front wheel steering system and a drive wheel bias system. The method comprises providing at least one wheel sprocket operatively connecting the steering input to at least one steerable front wheel and providing at least one steering cam that selectively couples the steering input to a pump mechanism of the drive wheel bias system to provide bias to the independently driven drive wheels of the vehicle via a forward input for delivering forward locomotive power to the drive wheel bias system.

The invention further provides a steering cam assembly comprising at least one steering cam rotatably mounted to a steering cam shaft about a first axis of rotation. The steering cam shaft is operatively connected to a steering input, wherein the at least one steering cam further comprises at least a portion of a perimeter disposed noncircularly about said first axis of rotation.

The invention also provides an oblongated sprocket for steering at least one front wheel of a multistage steering vehicle. The oblongated sprocket comprises at least two convex curved sides oppositely disposed separated by a first distance and at least two sides connecting the at least two convex curved sides separated by a second distance, wherein the first distance is greater than the second distance.

The invention further provides an engagement cam system for a vehicle with a multistage steering system comprising an engagement cam coupled to an engagement cam shaft rotatably connected to the vehicle. At least one steering cam is rotatably mounted to said vehicle and coupled to a steering device for receiving a steering input. At least one cam follower is coupled to the engagement cam shaft and moveable from a first nonengaging position wherein contact cannot occur between the at least one steering cam and the at least one cam follower, to a second engaging position wherein contact can occur between the at least one steering cam and the at least one cam follower. A forward control shaft is operatively connected to a forward input and rotatable by the forward input, and the forward input further engages the engagement cam to move the at least one cam follower from the first nonengaging position to the second engaging position.

Furthermore, a cruise control system is provided for a zero turn radius vehicle with steerable front wheels and independently driven drive wheels. The cruise control system comprises a cruise control link operatively coupled to a forward control mechanism providing power to the independently driven drive wheels in response to a forward input. A lever is rotatably mounted to the vehicle and movable from a first nonengaging position to at least one engaging position. A catch mechanism is engageable with the lever for maintaining a selected position of the lever, wherein when the catch mechanism engages the lever when it is in the at least one engaging position, the forward control mechanism continues to provide power to the independently driven drive wheels at a constant rate.

And, the invention provides an adjustable removable seat latch system comprising a latch coupled to a removable adjustment device. The latch further comprises an activation portion rotatably disposed oppositely from a catch portion. The catch portion further comprises an angled section terminating in a locking surface wherein the latch is biased in a position wherein the locking surface engages a structure external to the latch, and wherein the removable adjustment device comprises adjustment means for adjustability in at least one dimension.

BRIEF DESCRIPTION OF THE DRAWINGS

The present invention can take many physical embodiments and can assume many arrangements of components for carrying out the teachings of the invention, all of which may be appreciated by a person of skill in the art. The teachings of the present invention can be readily understood by considering the following detailed description of a preferred embodiment in conjunction with the accompanying drawings of said embodiment, in which.

DETAILED DESCRIPTION OF THE PREFERRED EMBODIMENT

While the present invention will be described more fully hereinafter with reference to the accompanying drawings in which particular embodiments and methods are shown, it is to be understood from the outset that persons of ordinary skill in the art may modify the invention herein described while achieving the functions and results of this invention. Sound engineering judgment may be used to modify various aspects and components of the invention without detracting from the broad, general teachings hereof. Accordingly, the description that follows is to be understood as illustrative and exemplary of specific embodiments within the broad scope of the present invention and not as limiting the scope of the invention. In the following descriptions, like numbers refer to similar features or like elements throughout.

Figure 6:
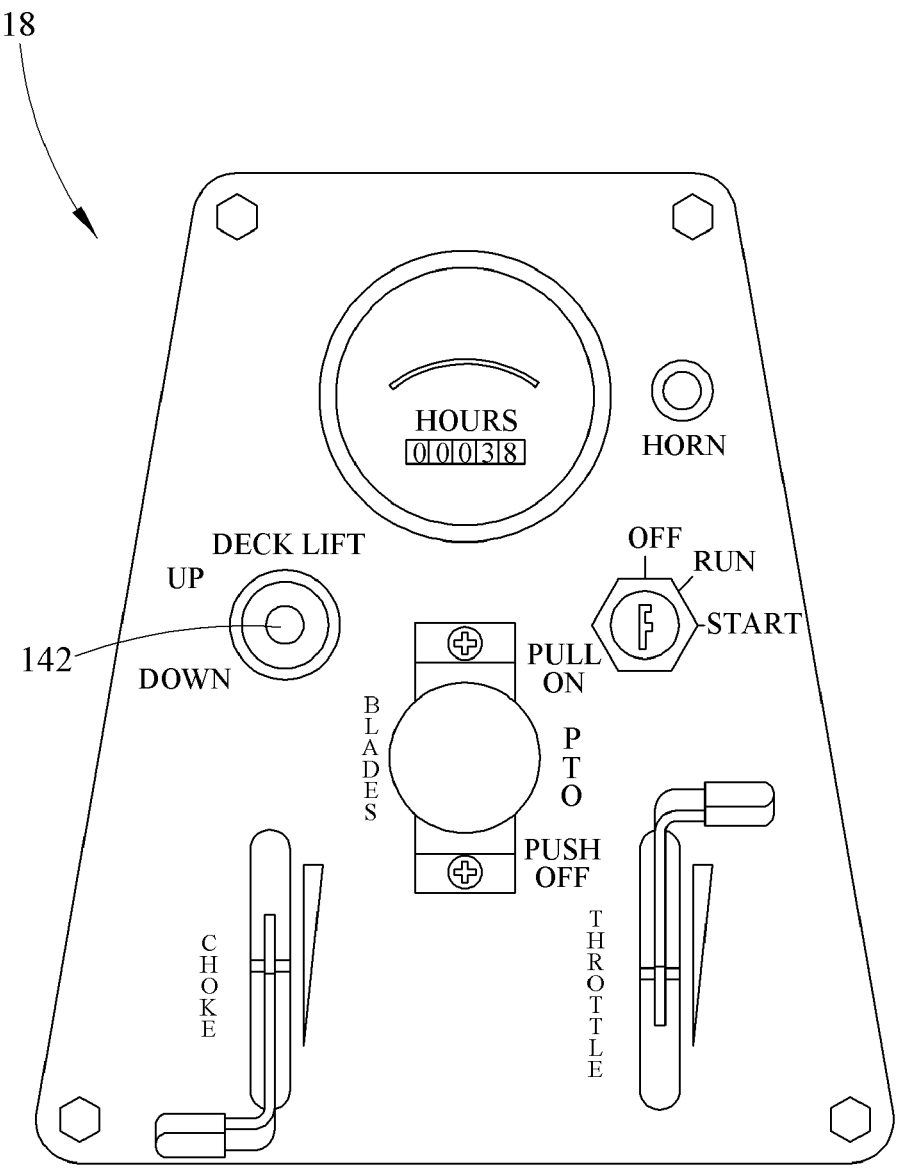
FIG. 6 is a control panel for a vehicle according to a preferred embodiment.

FIGS. 1 through 37 depict an apparatus 10 in the form of a vehicle according to one embodiment of the invention. Throughout this description the terms "apparatus" and "vehicle" will be used interchangeably. Referring first to FIGS. 1 through 6 generally, the apparatus 10 generally comprises a frame 11 to which is connected to at least one steerable front wheel, but preferably to first and second steerable front wheels 20, 30 and first and second drive wheels 40, 50. An engine 12 is mounted on the frame 11 to provide power for the apparatus 10. Obviously the engine 12 can be an internal combustion engine, a diesel engine, or any other form of engine known in the art for providing adequate power to vehicles of this sort. Preferably a seat 13 is also mounted on the frame 11, via a seat mount 13a to provide seating for the user. A steering device 61 is also mounted on the frame 11 to allow the user to provide steering inputs to the apparatus 10. Likewise, a forward input 70 and a reverse input 80 are also shown and are provided in a convenient location for the user. In the embodiment shown, the forward input 70 comprises a pedal 71 and the reverse input 80 comprises a reverse pedal 81, but obviously other configurations are possible (a single pedal, levers, sticks, joysticks, and so forth). Because a preferred embodiment of the apparatus 10 is in the form of a lawnmower, a mowing deck 14 is also shown, and a control panel 18 is shown in FIG. 6.

Referring generally to FIGS. 14 and 17 through 31, the apparatus 10 provides a multistage steering input to both steer the first and second steerable front wheels 20, 30 and to selectively engage a drive wheel locomotion system 700 in a manner that slows the speed of the inside drive wheel. The multistage steering of the apparatus 10 does not link every steering input to the drive wheel locomotion system. Rather, with the use of an engagement cam system 740 (to be described later), the steering of the apparatus 10 is bifurcated into two separate types of steering results. However, before this multistage steering is described, a description of the means for locomotion is described.

In general, a drive wheel locomotion system 700 is used to provide mobility for the vehicle in both forward and reverse directions. The following description of one embodiment of the drive wheel locomotion system 700 in a forward direction will discuss specific components of a preferred system with reference numerals beginning with the digits 4, 5, 7, and 9. It should be understood, however, that this description is not meant to limit in any way the overall system; rather, it is used to describe the embodiment shown in sufficient detail for a complete understanding.

Referring now to FIGS. 7, 8, 11, and 13, an independent drive unit is connected to each of the first and second drive wheels 40, 50. A first drive unit 41 is connected to the first drive wheel 40, while a second drive unit 51 is connected to the second drive wheel 50. In the depicted embodiment, the first drive unit 41 comprises a first hydrostatic pump 42 and the second drive unit 51 comprises a second hydrostatic pump 52. Other drive units 41, 51, as the means for driving the apparatus 10, are possible, including transmissions, electric drive units, belt drive units, and so forth. In the depicted embodiment, the means for driving the apparatus 10 are the first and second hydrostatic pumps 42, 52 and their associated motors, hydraulic reservoirs, and hoses. These pumps 42, 52 may be any of a number of known types and styles of hydrostatic pumps, in particular pumps manufactured by Hydrogear. To list but a few, Hydrogear BDP-10, BDP-12, BDP-16, BDP-20, and BDP-24 work well in the invention, with BDP-10, BDP-12, and BDP-16 pumps being preferred, depending on the size of the vehicle 10. The pumps 42, 52 include pump shafts 43, 53 for connection (via pulley or similar means) to the engine 12 for power.

Figure 1:
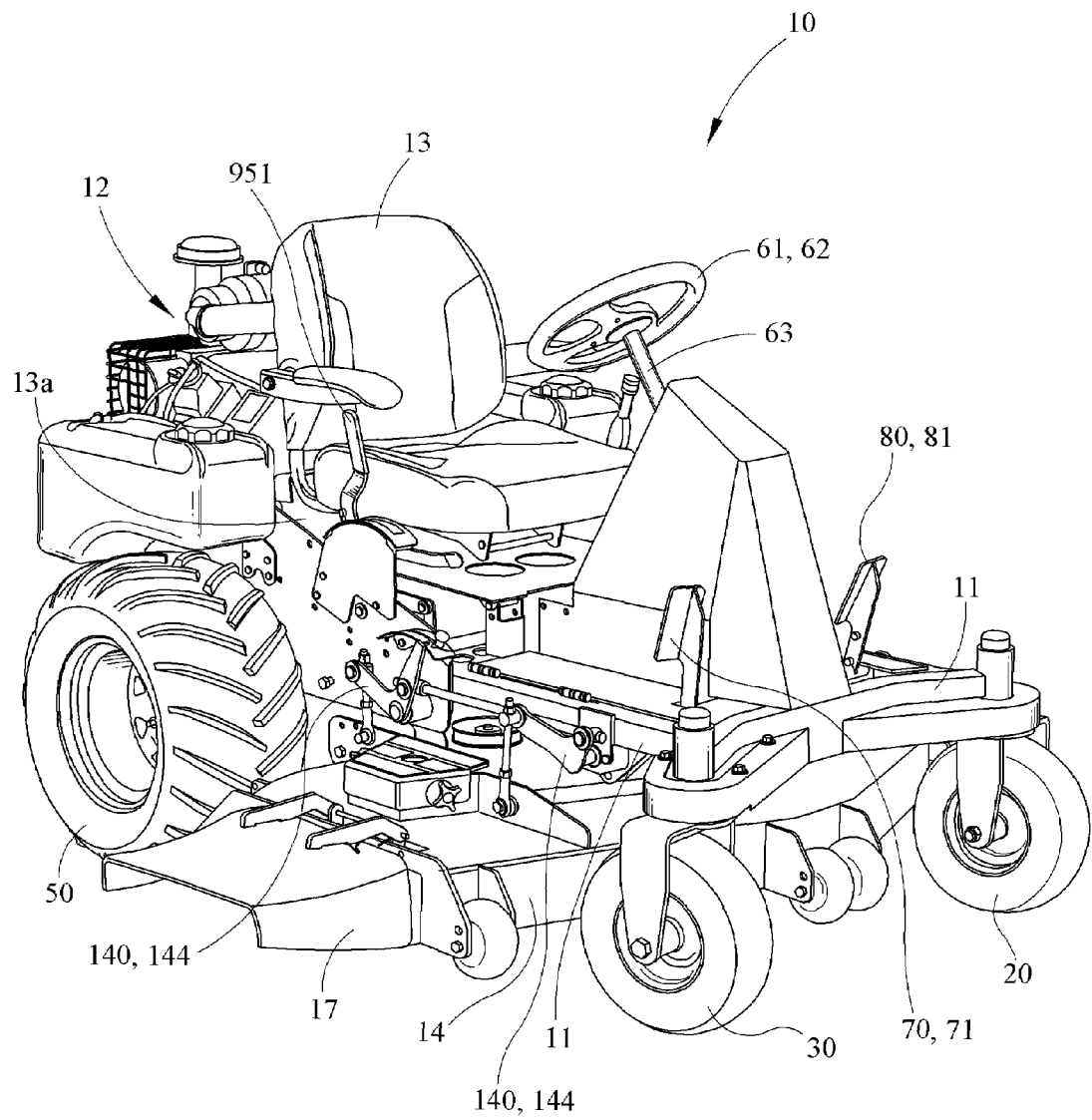
FIG. 1 is a perspective view of an apparatus according to a preferred embodiment in the form of a zero-turn radius lawn mower.
Figure 2:
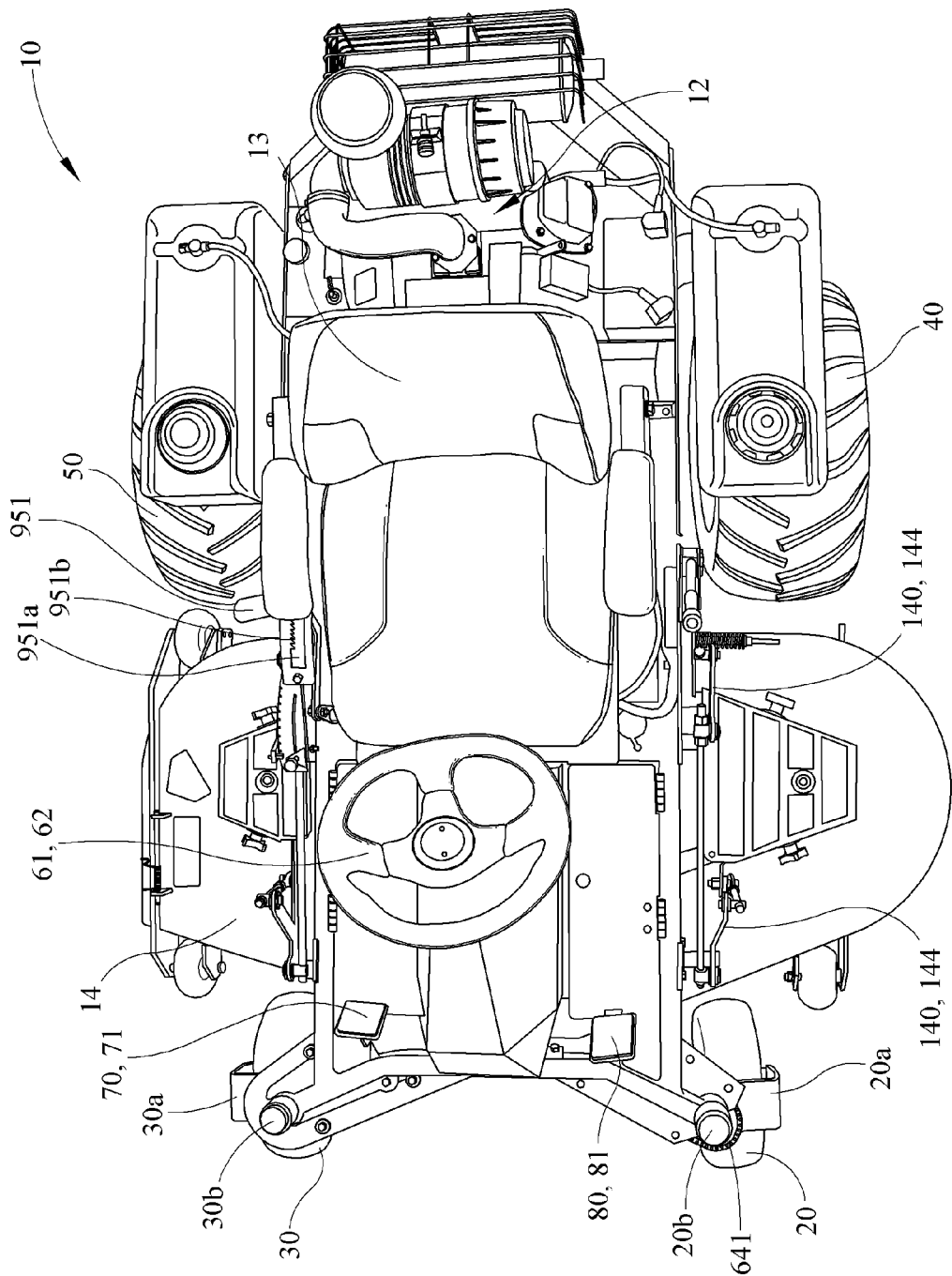
FIG. 2 is a top view shown slightly in perspective of the apparatus shown in FIG. 1.
Figure 3:
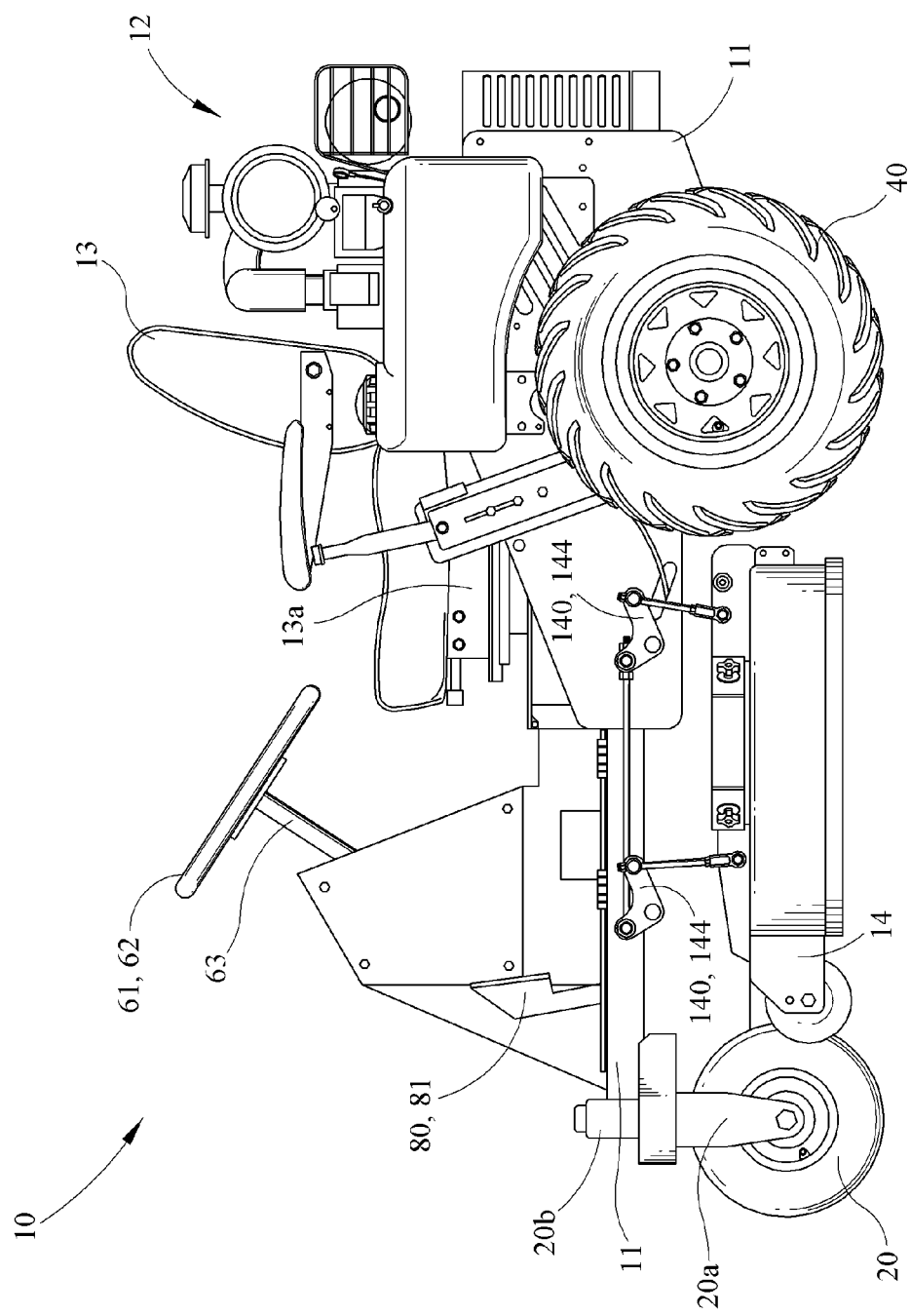
FIG. 3 is a left side elevation view of the apparatus shown in FIG. 1.
Figure 4:
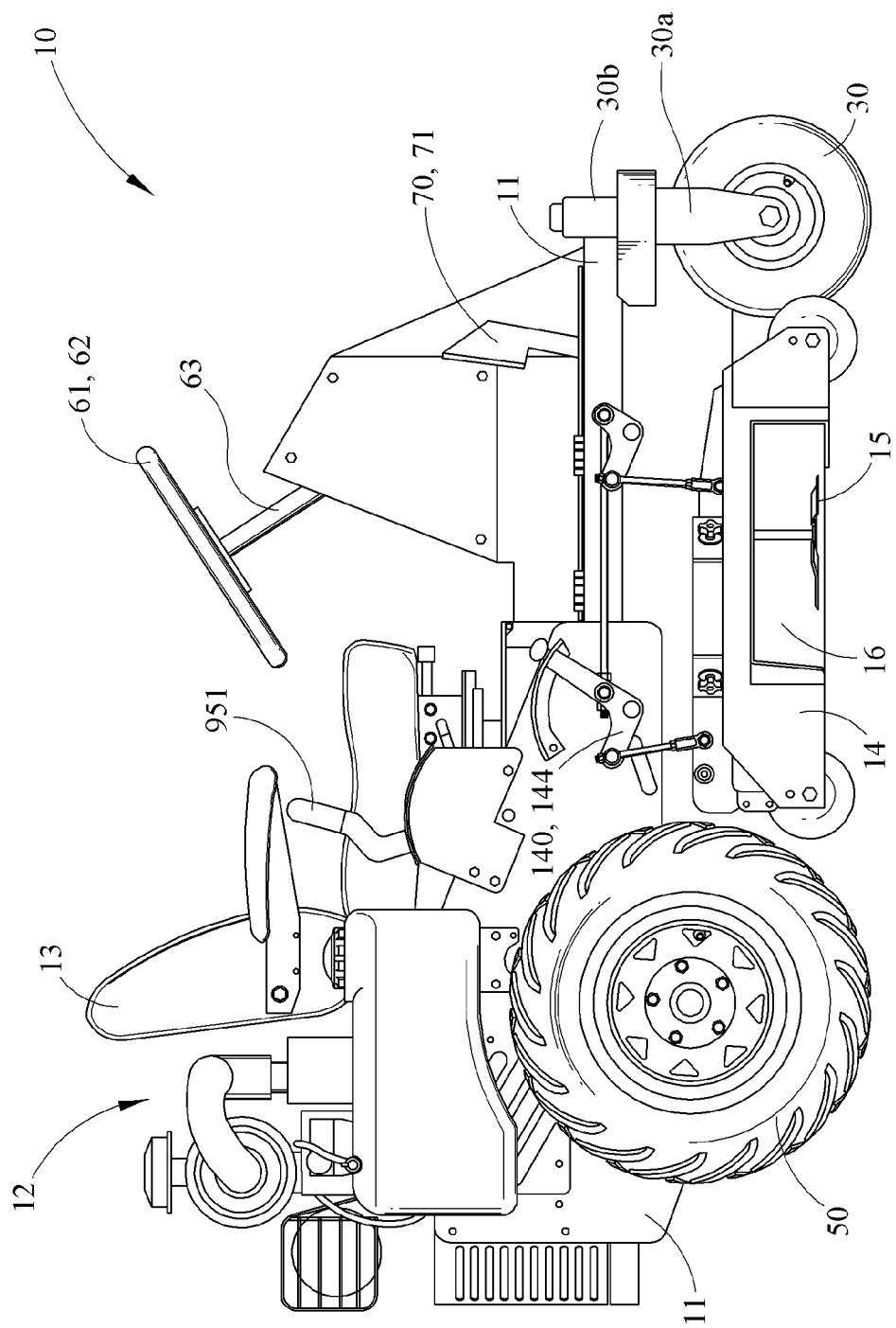
FIG. 4 is a right side elevation view of the apparatus shown in FIG. 1.
Figure 5:
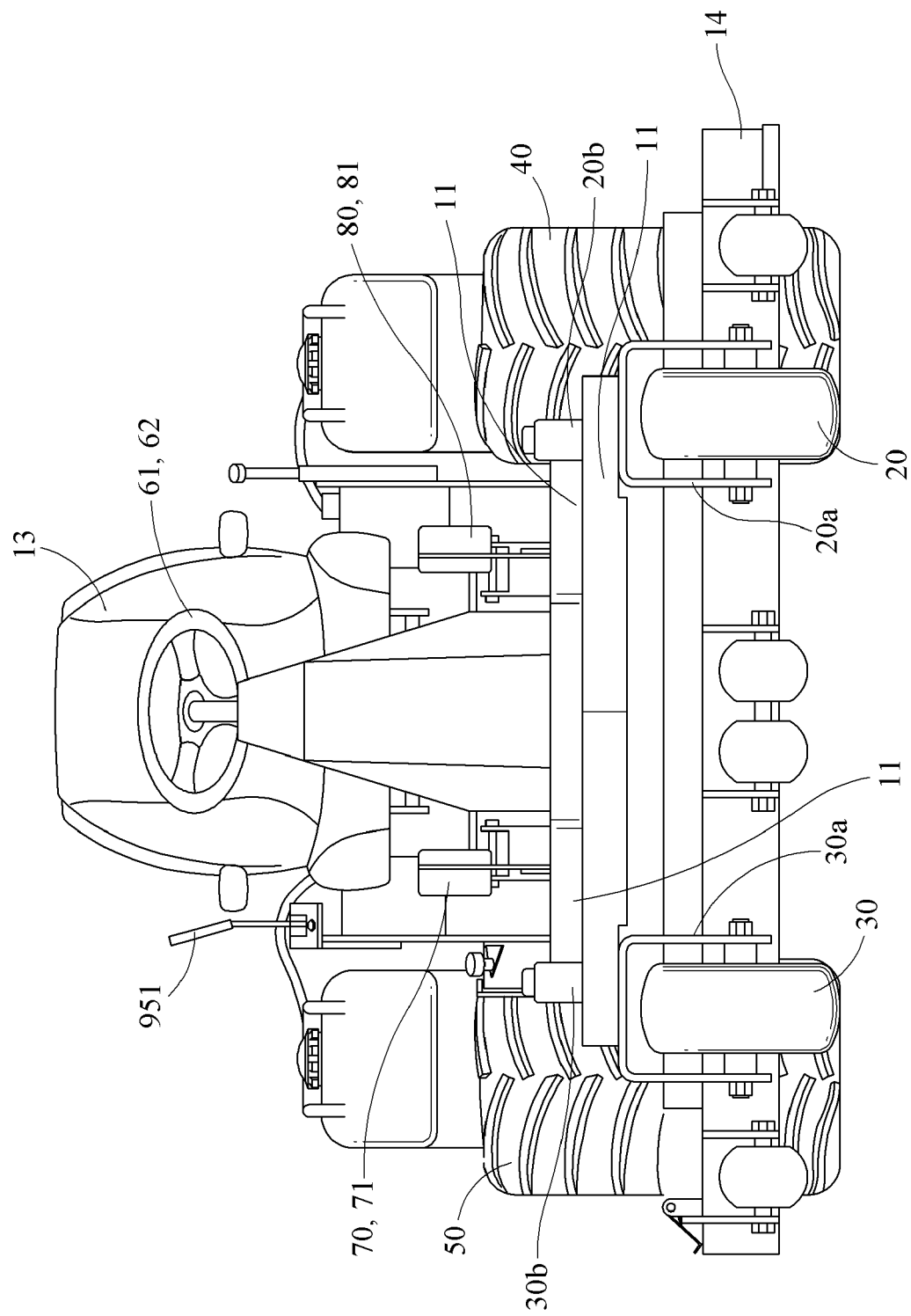
FIG. 5 is a front elevation view of the apparatus shown in FIG. 1.

The drive units 41, 51 of the depicted embodiment further comprise a first drive motor 44 and a second drive motor 54, which are operated by the first and second hydrostatic pumps 42, 52, respectively. The first drive motor 44 is connected to the first drive wheel 40 via an output shaft 45. The second drive motor 54 is connected to the second drive wheel 50 via an output shaft 55. The first hydrostatic pump 42 includes a pump arm 46. The pump arm 46 is rotatably connected to the first hydrostatic pump 42 on an axis of rotation 46a. Connected to the pump arm 46 and internal to the pump 42 is a swash plate 47 (not shown). Swash plate 47 regulates the amount and direction of power delivered by the first drive unit 41 to the first drive wheel 40 via output shaft 45. When the pump arm 46 is rotated about its axis of rotation 46a, the swash plate 47 likewise rotates inside the first hydrostatic pump 42 to control fluid flow. Pump arm 46 can be rotated in a forward (clockwise when viewing the vehicle 10 as shown in FIG. 4) or a backward (counterclockwise when viewing the vehicle 10 as shown in FIG. 4) direction. Throughout this discussion the terms "forward" and "backward" or "rearward" refer to the directions associated with the vehicle 10 shown in the figures, where "forward" would normally be associated with a direction toward the front of the vehicle 10, and "backward" would normally be associated with a direction toward the back of the vehicle 10.

As will be discussed below, the pump arm 46 may be rotated about its axis of rotation 46a forward or backward in response to operator input. When the pump arm 46 is rotated forward, it causes the swash plate 47 to rotate forward, which in turn causes power to be applied to the first drive wheel 40 in the forward direction in an amount proportional to the amount of forward input applied by the operator. When the pump arm 46 is moved in a rearward direction, the swash plate 47 is moved in a rearward direction, causing power to be applied to the first drive wheel 40 in the reverse direction.

In like manner, second hydrostatic pump 52 includes a pump arm 56, an axis of rotation 56z, and a swash plate 57, and operates in the same manner as the above-described first hydrostatic pump 42. In this manner, the speeds of the first drive wheel 40 and the second drive wheel 50 may be independently manipulated to achieve zero radius turning. A pump forward control assembly 480 connects a forward pedal 71 to the pump arms 46, 56 (see below for further discussion) such that when the forward pedal 71 is activated, both pump arms 46, 56 rotate forward in equivalent amounts.

When neither forward nor reverse input is being applied by the operator via the forward input 70 or reverse input 80, the pump arms 46, 56 and swash plates 47, 57 rest in a neutral position and no output is applied to the drive wheels 40, 50 by the drive motors 44, 54. In the depicted embodiment, a biasing means (not related to the defined term "bias" set forth above in relation to the differing speeds of the drive wheels) is used to return the system to a neutral position, wherein the apparatus 10 is at rest. The biasing means of the depicted embodiment comprises a first spring 90 having a first end 90a connected to a forward control shaft 712 (described below) and a second end 90b connected to the frame 11. Preferably a second spring 91 having a first end 91a connected to a gusset plate 765 and a second end 91b connected to the frame 11 is also provided to ensure a safe and quick return to neutral. Pump control springs 483, 484 are also provided to assist the vehicle in finding neutral. Magnetic sensing proximity switches 486 are also provided in satisfaction of ANSI-B71.4 safety standard that requires switches that sense neutral. This prevents the vehicle 10 from being started if not in neutral.

Figure 12:
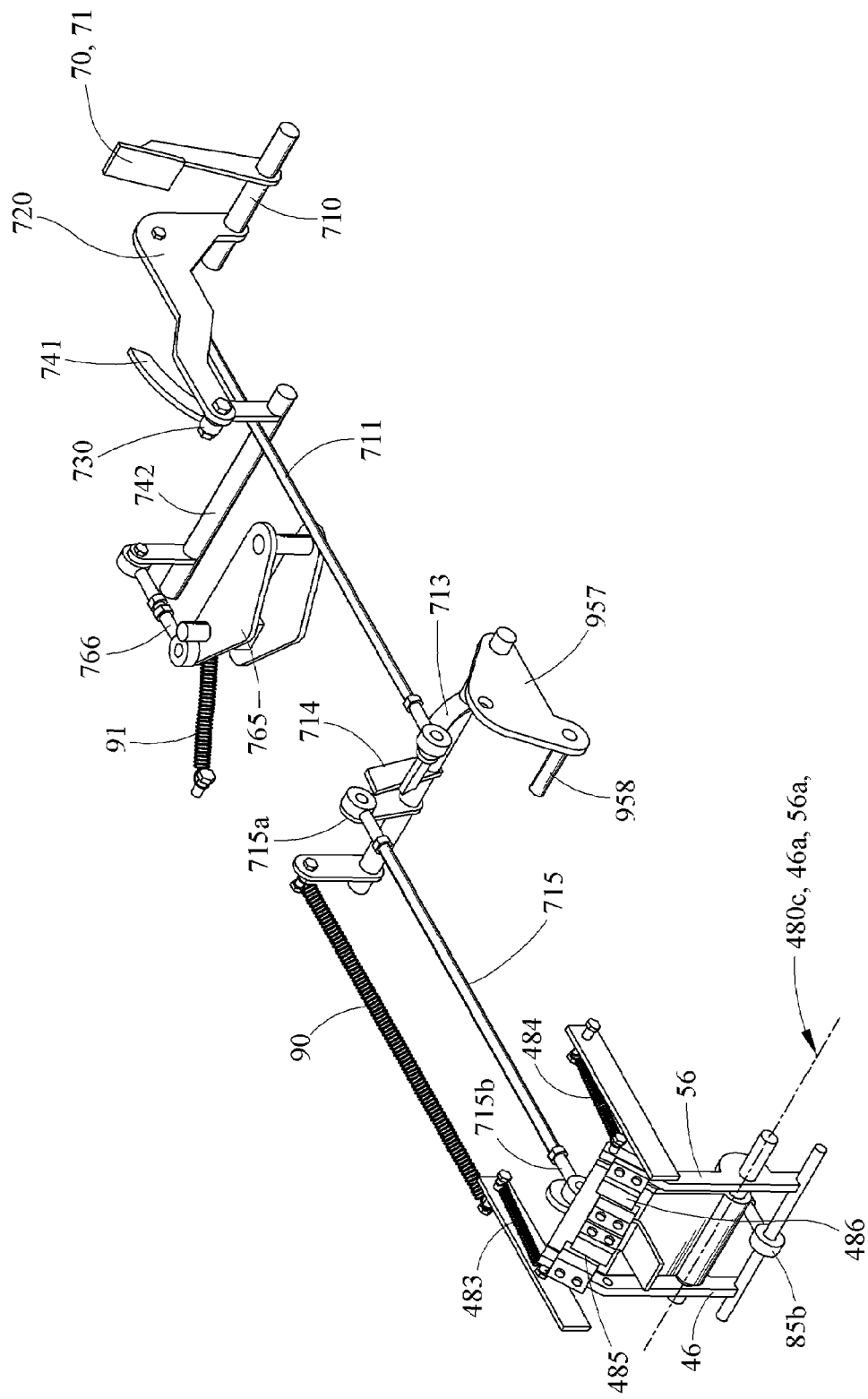
FIG. 12 is a perspective view of the forward control shaft linkage and the engagement cam shaft linkage of a vehicle according to a preferred embodiment.
Figure 13:
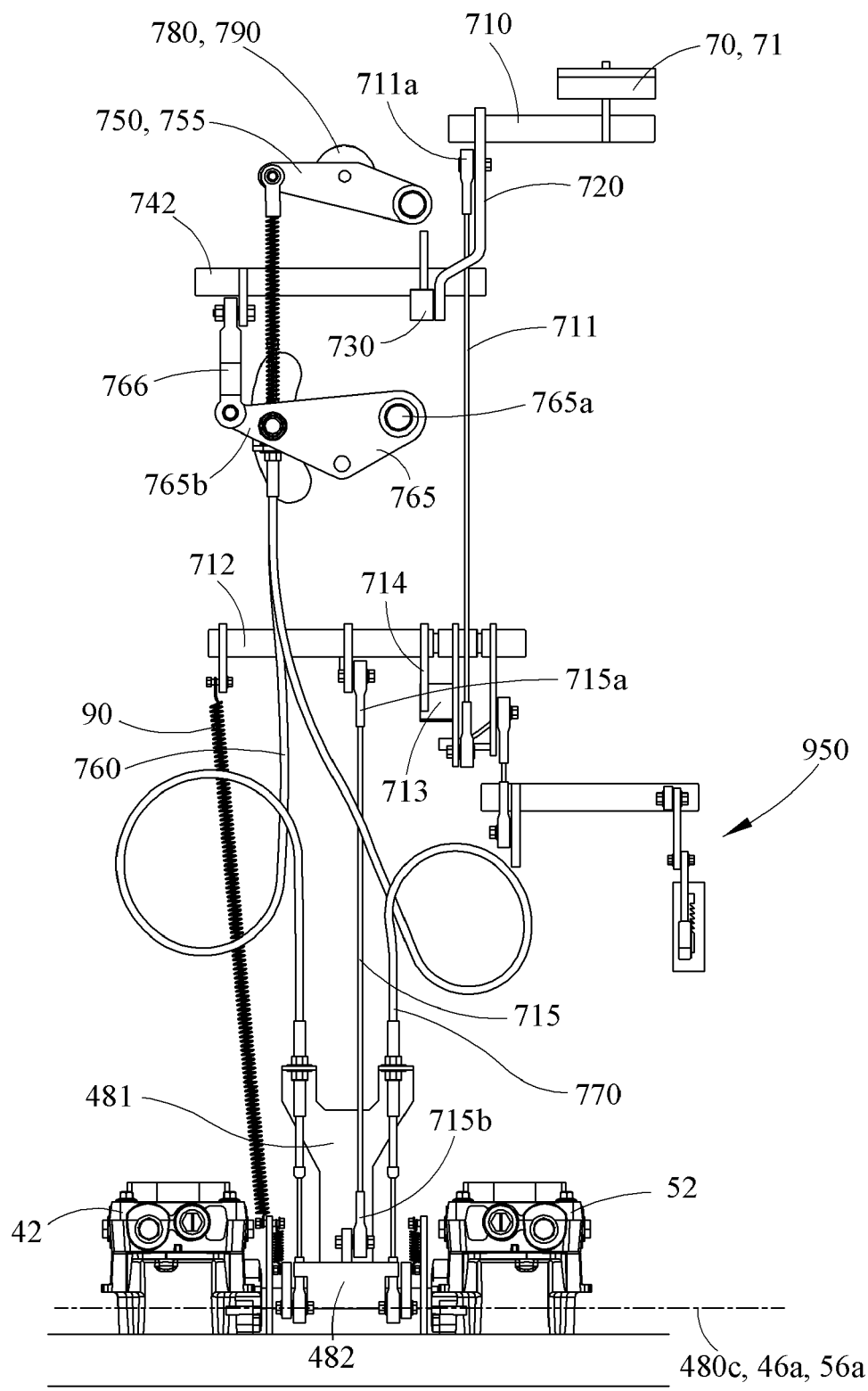
FIG. 13 is top view of the forward control shaft linkage and the engagement cam shaft linkage shown in FIG. 12.
Figure 14A:
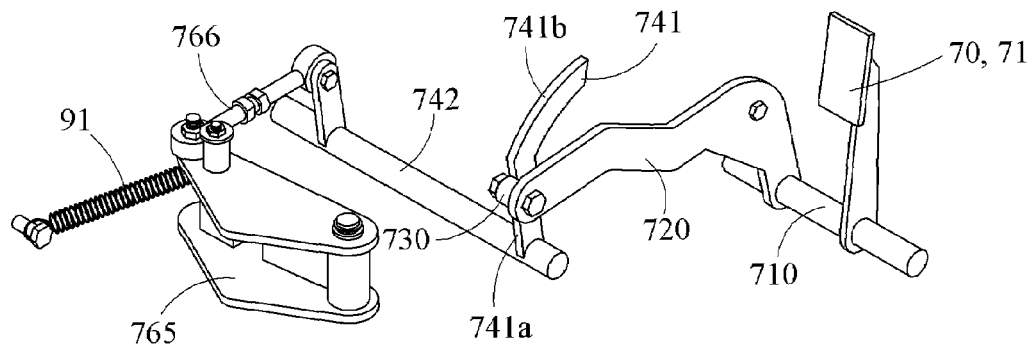
FIG. 14A is a perspective view of the engagement cam shaft linkage of a vehicle according to a preferred embodiment shown when the forward input has been depressed enough to bring the engagement cam roller into contact with the first surface of the engagement cam.
Figure 14B:
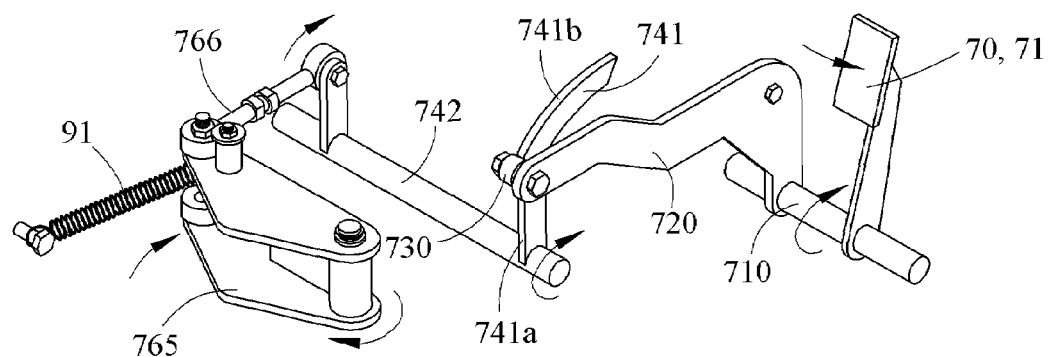
FIG. 14B is a perspective view of the engagement cam shaft linkage of FIG. 14A shown after additional forward input moving the engagement cam roller to the second surface of the engagement cam, indicating rotation of the engagement cam shaft and movement of the gusset plate.
Figure 14C:
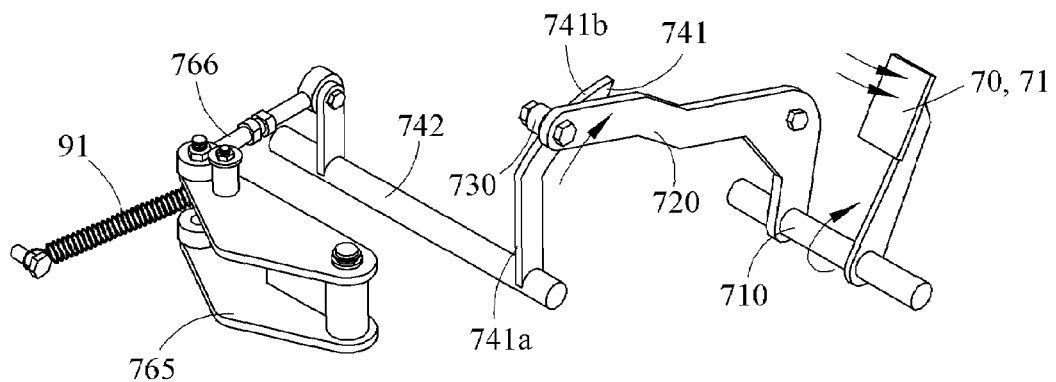
FIG. 14C is a perspective view of the engagement cam shaft linkage of FIG. 14B shown after additional forward input, indicating no additional rotation of the engagement cam shaft and no additional movement of the gusset plate.
Figure 15:
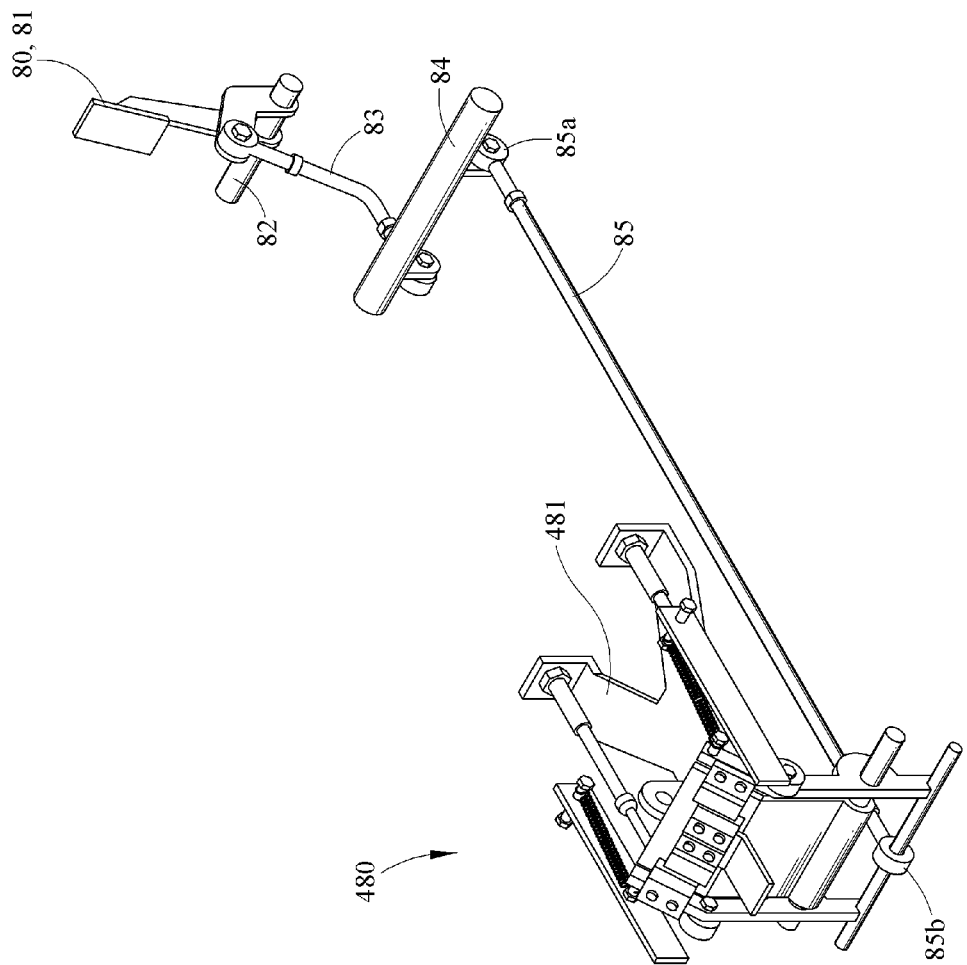
FIG. 15 is a perspective view of the reverse input linkage of a vehicle according to a preferred embodiment.
Figure 16:
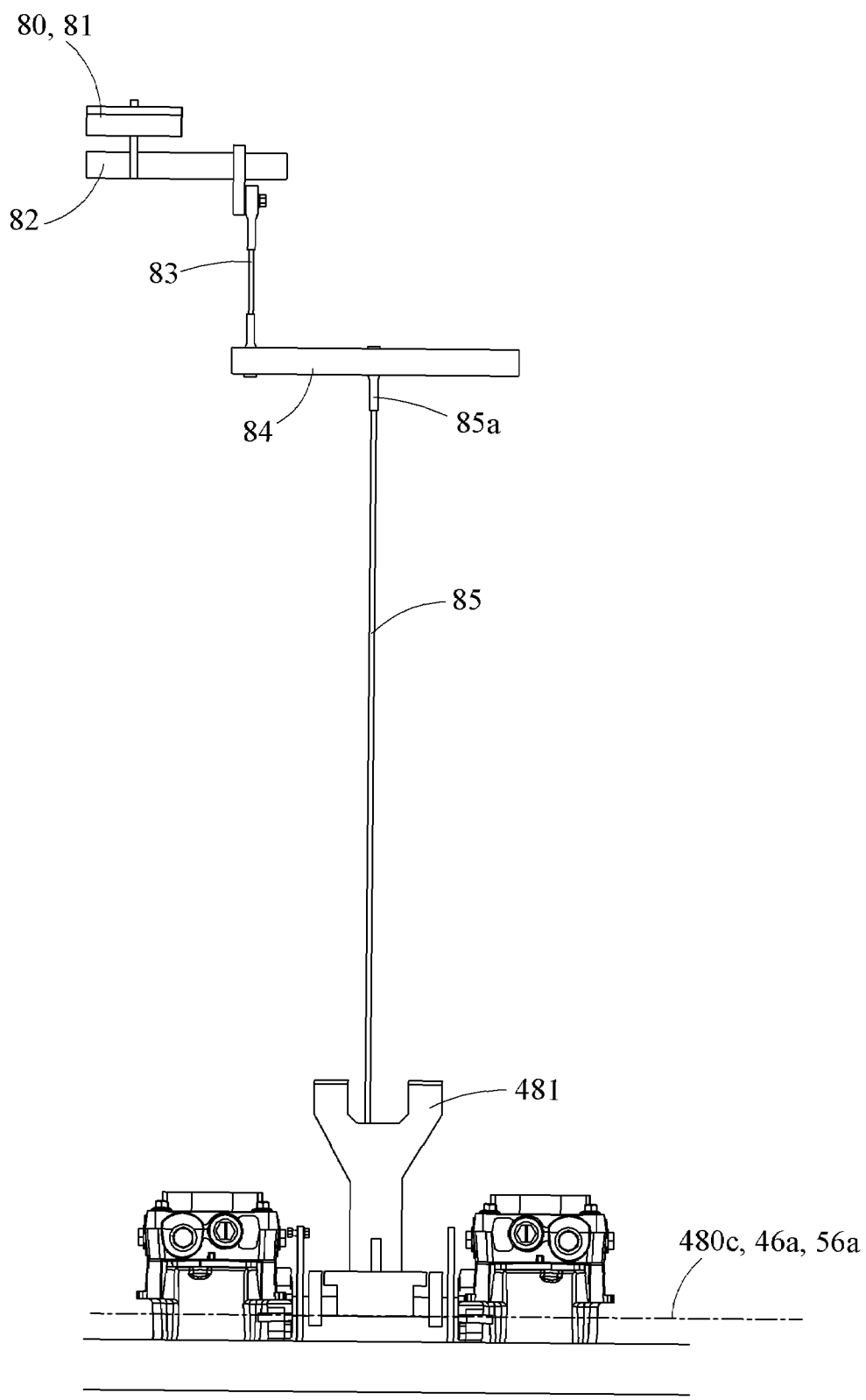
FIG. 16 is a top view of the reverse input linkage shown in FIG. 15.
Figure 17:
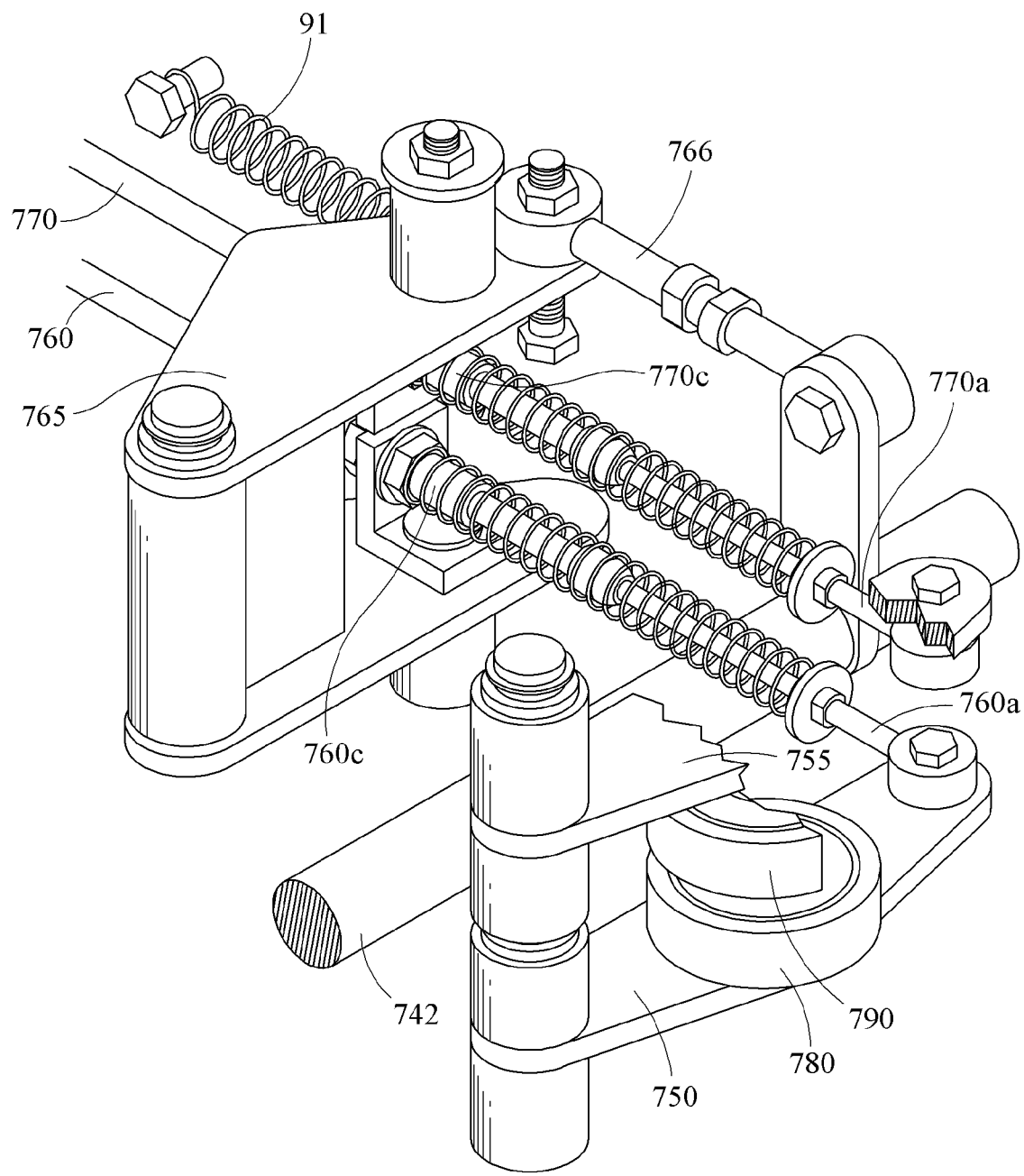
FIG. 17 is a perspective view of the gusset plate and cam followers according to the preferred embodiment.
Figure 18:
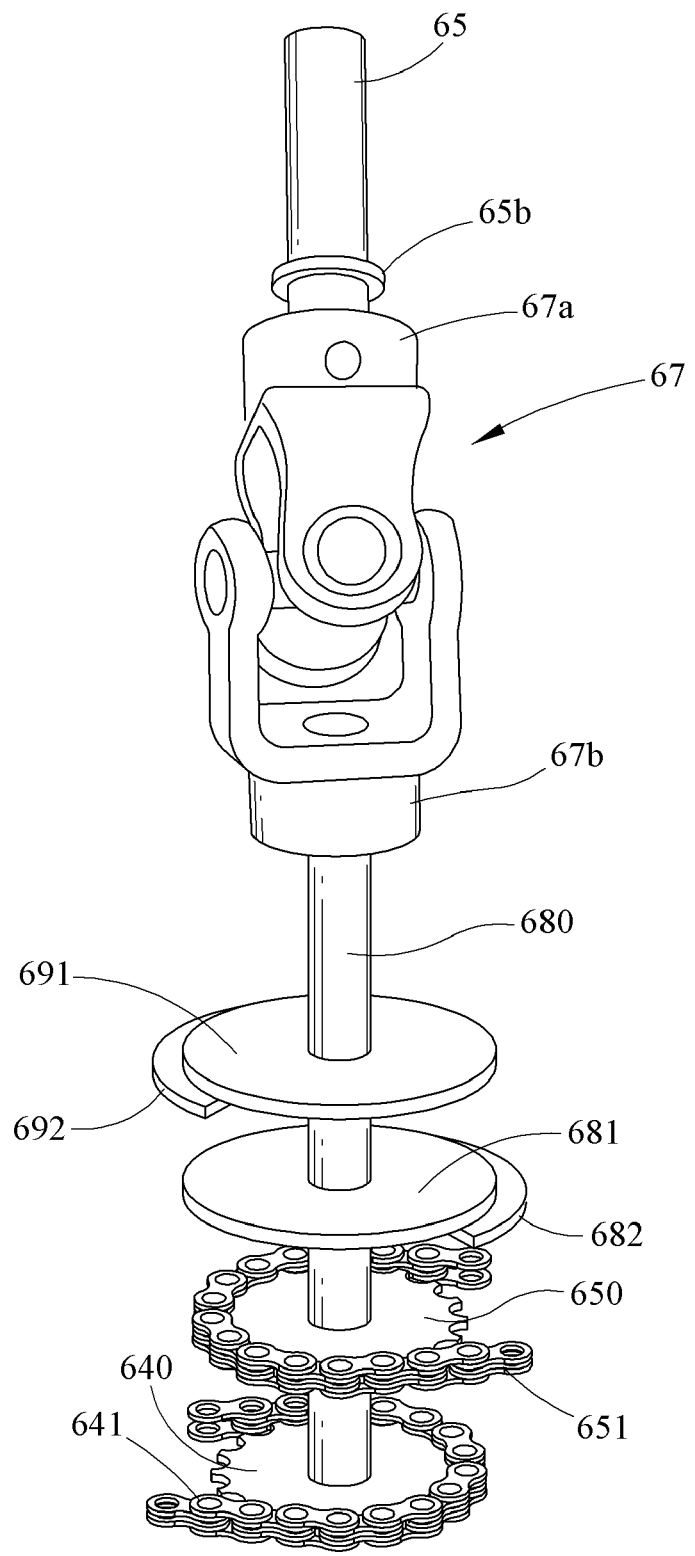
FIG. 18 is a front partial perspective view of a portion of the steering system according to a preferred embodiment, showing a part of a steering shaft and a portion of a steering cam shaft, joined by a universal joint.
Figure 19:
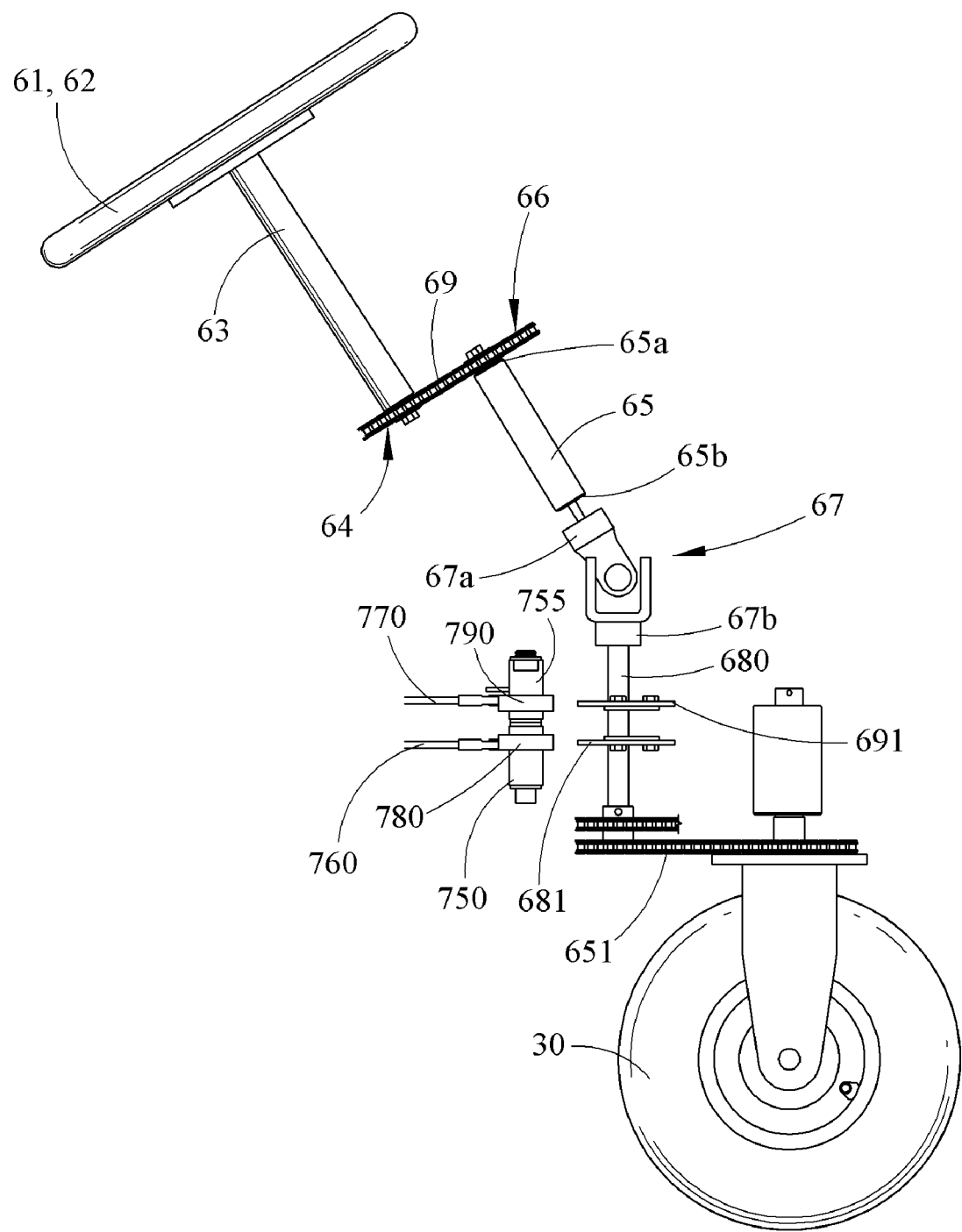
FIG. 19 is a partial right side elevation view of a steering system according to a preferred embodiment shown with no steering input.
Figure 20:
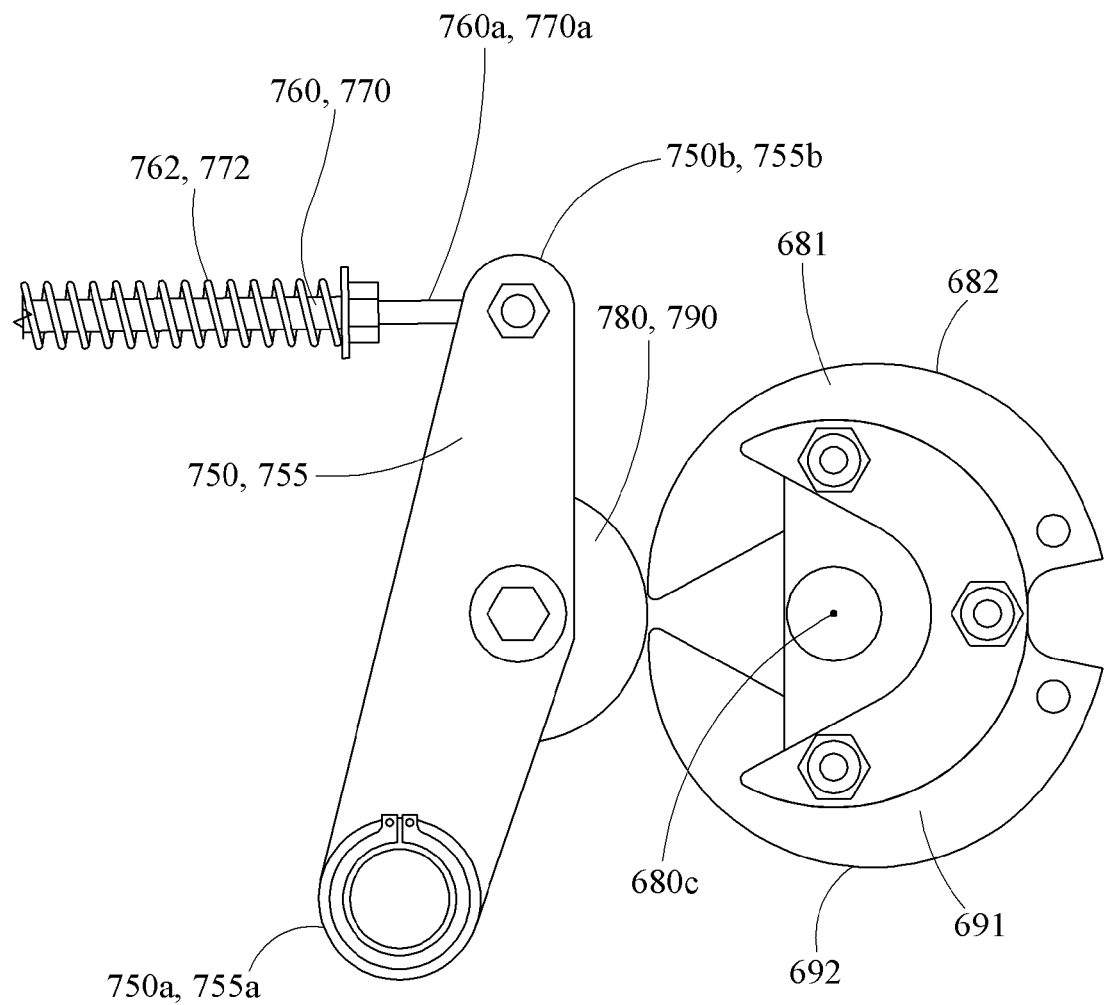
FIG. 20 is a plan view of a portion of an engagement cam system according to a preferred embodiment, showing a steering input of zero and showing the first and second cam followers in a forward receiving position to receive contact from the first or second steering cams.

Although the details of each of these components will follow, at this point a general understanding of the main shafts of the vehicle 10 is instructive. In general, referring to FIG. 11, three separate rotating shafts are provided. FIGS. 12 and 13 show a forward control shaft 712 and its associated preferred linkages. FIGS. 14A, 14B, and 14C show an engagement cam shaft 742 and its associated preferred linkages. FIGS. 15 and 16 show a reverse linkage shaft 84 and its associated preferred linkages. The forward control shaft 712 connects a forward input to the pump forward control assembly 480 to rotate the pump arms 46, 56 in a forward direction equally. The reverse linkage shaft 84 connects a reverse input to the pump arms 46, 56 in a manner that rotates the pump arms 46, 56 in a backward direction, equally. The engagement cam shaft 742 connects to the forward input via an engagement cam 741 to first and second cam followers 750, 755 that move first and second bearings 780, 790 into a position in which the bearings 780, 790 can be contacted by first and second steering cams 681, 691, respectively.

Now that some of the general structures associated with the drive wheel locomotion system 700 have been described, attention will be turned to additional preferred structures used to operate the drive wheels 40, 50. In general, the following discussion describes a drive wheel locomotion system 700 according to the depicted embodiment. Referring again to FIGS. 11 through 14, forward pedal 71 is rotatably connected to a forward pedal pivot 710. A first forward link 711 having a first end 711a and a second end 711b is connected at its first end 711a to the forward pedal pivot 710. The second end 711b of the first forward link 711 is connected to a forward control shaft 712 via an arm 713. The forward control shaft 712 is rotatably connected to the frame 11 and further comprises a tab 714 extending therefrom. As will be described again later, forward movement of the first forward link 711 brings arm 713 into engagement with tab 714, and further forward movement then rotates forward control shaft 712.

A second forward link 715 is connected at its first end 715a to an arm 716 connected to the forward control shaft 712. A second end 715b of the second forward link 715 is connected to the pump forward control assembly 480. The pump forward control assembly 480 is preferably a welded assembly having a pivot or axis of rotation 480c located on the same axis of rotation 46a, 56a as the pump arms 46, 56 and for the swash plates 47, 57. In fact, the pump arms 46, 56 are directly connected to the pump forward control assembly 480 via forward control assembly link 481 such that movement of the pump forward control assembly 480 rotates the pump arms 46, 56. A contact plate 482 provides a rest position for pump arms 46, 56 such that when pump forward control assembly 480 is rotated forward, pump arms 46, 56 maintain their rest position at contact plate 482. In this manner, forward movement of the second forward link 715 rotates both pump arms 46, 56 equally about the axis of rotation 46a, 56a, causing drive wheels 40, 50 to rotate at equal speeds, causing straight forward motion of the vehicle 10.

A first push cable 760, having a first end 760a and a second end 760b, and a second push cable 770, having a first end 770a and a second end 770b are also provided. The first ends 760a, 770a of the push cables 760, 770 are connected, respectively, to the first and second cam followers 750, 755. The second ends 760b, 770b of the first and second push cables 760, 770 are connected, respectively, to the pump arms 46, 56 via the pump forward control assembly 480. The first and second push cables 760, 770 are connected to the pump forward control assembly 480 in such a manner that they can move forward together, but their second ends 760*b*, 770*b* can move backward independently. When they move forward, the pump forward control assembly 480 provides the forward movement to the pump arms 46, 56 in equal amounts. However, when the first and second push cables 760, 770 move backward, they can independently push the push arms 46, 56, respectively. In this manner, the first and second push cables 760, 770 provide a compression link between the pump arms 46, 56 and the first and second cam followers 750, 755, respectively.

Referring now to FIGS. 11 through 13 and 17, a gusset plate 765 provides the main rotatable mount for the housing 760*c* of the first push cable 760 and for the housing 770*c* of the second push cable 770. The gusset plate 765 has a first end 765*a* and a second end 765*b*. The first end 765*a* is pivotally connected to the frame 11. The second end 765*b* further comprises a gusset plate link 766 directly connecting the gusset plate 765 to the engagement cam shaft 742. In this manner, forward rotation of the engagement cam shaft 742 results in forward rotation of the gusset plate 765, and thus results in forward rotation of the first and second cam followers 750, 755 via gusset link 766. This movement is shown in FIGS. 14A and 14B.

Figure 11:
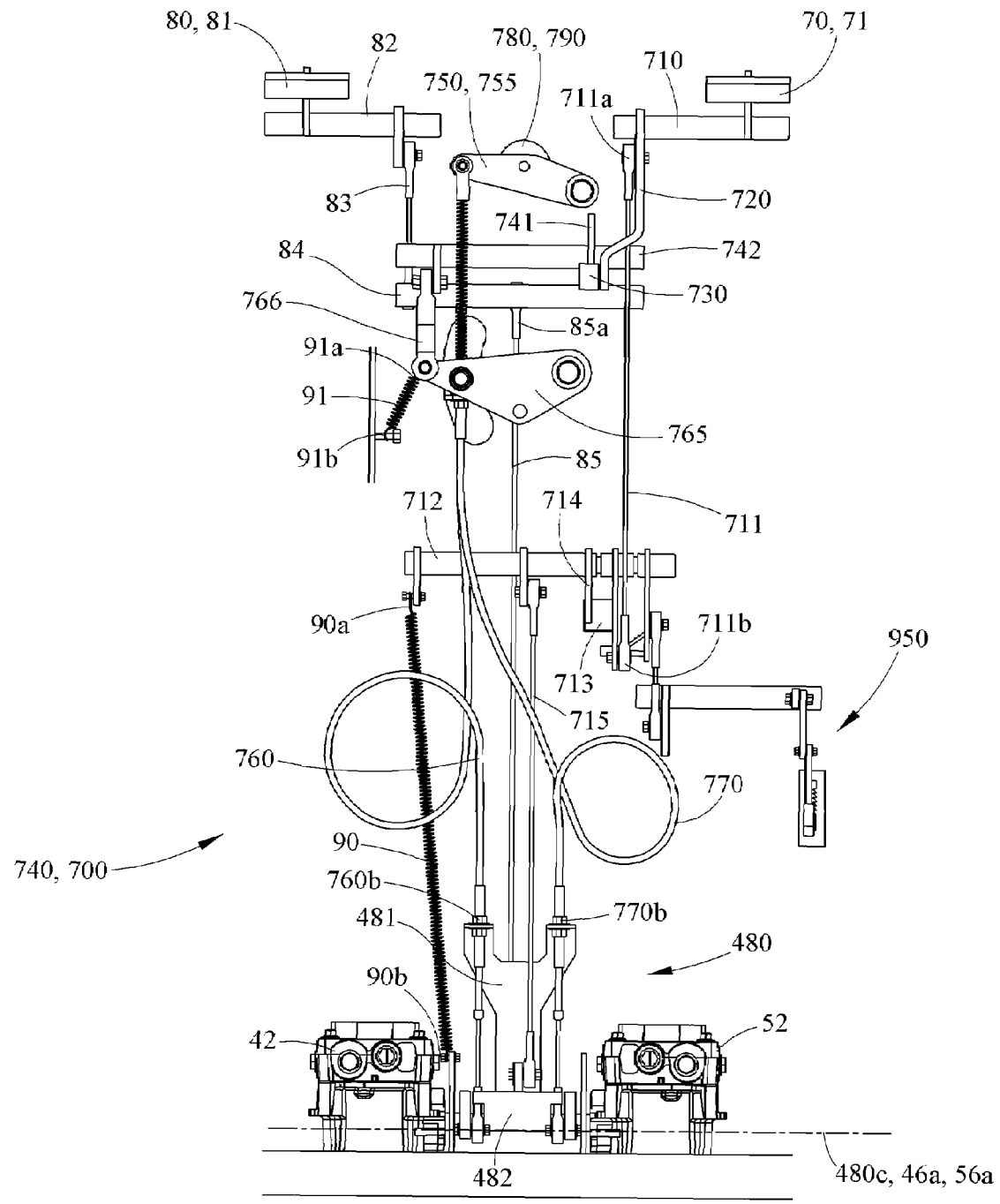
FIG. 11 is top view of the major linkages and systems of a vehicle according to a preferred embodiment.
Figure 25:
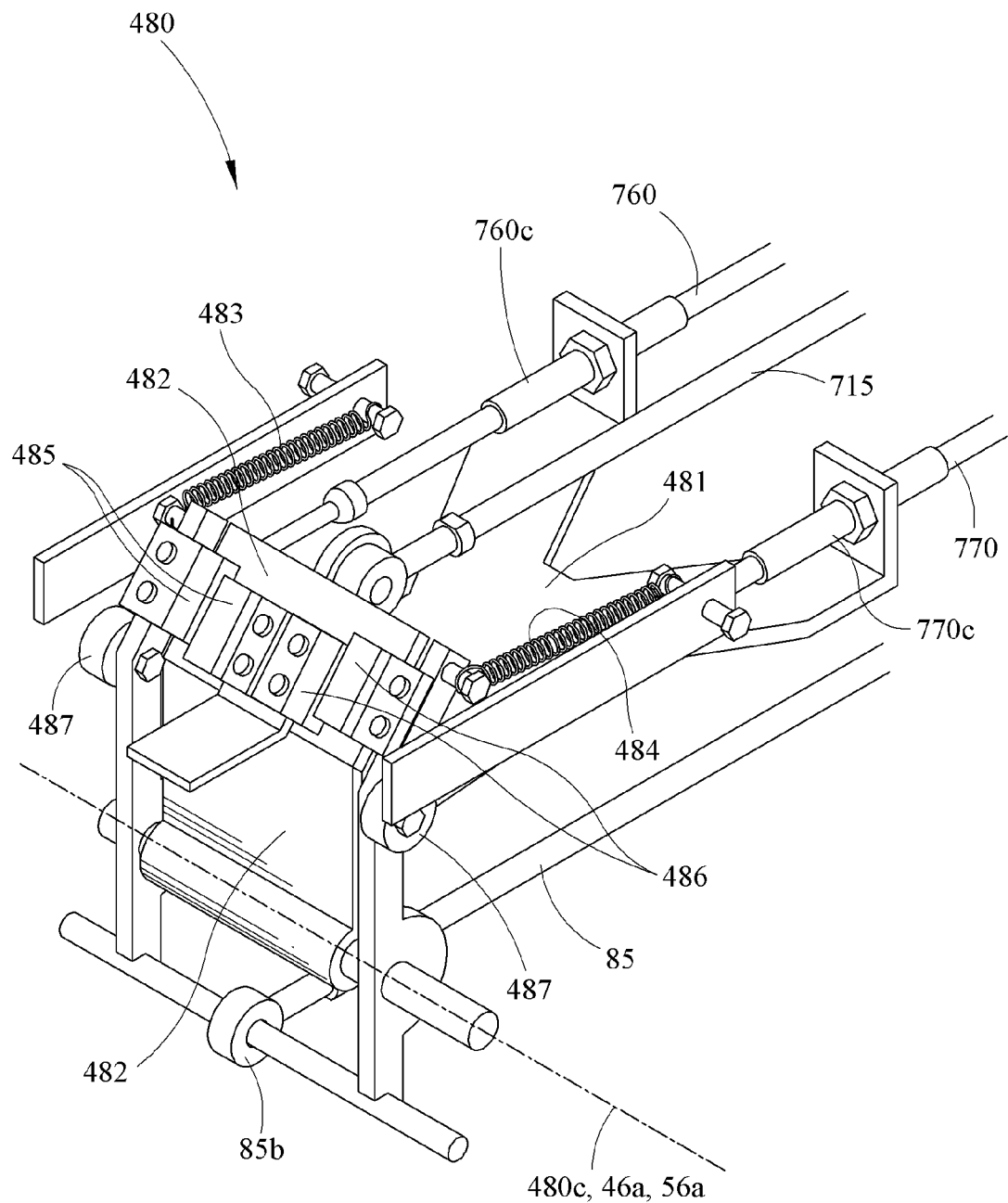
FIG. 25 is a perspective view of the pump forward control assembly of a vehicle according to the preferred embodiment showing the vehicle in neutral and showing no steering input.

Referring to FIGS. 11, 13 and 25, note that the pump forward control assembly 480 always moves the pump arms 46, 56 forward in equal amounts, as a result of forward control assembly link 481. In this manner, depressing the forward pedal 71 does not, by itself, perform any turning of the vehicle 10. This is true because simply depressing the forward pedal 71 provides no ability to move the pump arms 46, 56 independently of each other. In this manner, the engagement cam shaft 742 can be rotated by pressing the pedal 71, thereby moving the first forward link 711 forward, which in turn moves the second forward link 715 forward, which in turn rotates the pump forward control assembly 480, thus rotating the pump arms 46, 56 and the swash plates 47, 57 in equal amounts.

Now that the overall operation of the means for locomotion has been described, attention turns to the multistage steering capabilities of the apparatus 10. As stated, the vehicle 10 of the depicted embodiment can provide, selectively, steering input in two stages. These stages can occur simultaneously. First, the steering input directly controls a front wheel steering system 600 to directly steer the first and second steerable front wheels 20, 30. Second, the steering input, depending on the speed and the direction of the vehicle 10, contains a unique system for selectively engaging the drive wheel locomotion system 700 (described above) in a manner that allows the inside drive wheel 40, 50 (depending on the direction of the steering input) to be slowed. Importantly, not all steering inputs automatically engage the drive wheel locomotion system 700 to alter the speed of one drive wheel 40, 50 with respect to the other. It will be beneficial to first provide a discussion of the front wheel steering system 600.

Referring again to FIGS. 7 through 10, the front wheel steering system 600 includes a steering device 61 (in this embodiment the steering device 61 is a steering wheel 62). The steering wheel 62 is mechanically connected to the first and second steerable front wheels 20, 30. It should be noted that while mechanical steering linkage is herein further described, any form of steering linkage that can translate a steering input from the steering wheel 62 to a steering cam shaft 680 (described below) may be possible as known in the art to achieve the intended functions described herein. For example, the mechanical steering system 600 may include a hydraulic steering system with its associated pumps and connections in known fashion. Because this embodiment uses mechanical linkages, only the mechanical system will be further described.

Referring additionally to FIGS. 18, 19, 21, and 23, the steering wheel 62 is connected to a first steering wheel shaft 63 at the end of which is a first sprocket 64. It can be seen that the first steering wheel shaft 63 is typically disposed at an angle relative to vertical. A second steering wheel shaft 65, having first and second ends 65*a*, 65*b*, respectively, comprises a second sprocket 66 attached at the first end 65*a*. The second end 65*b* is connected to a first end 67*a* of a universal joint 67 (having a first end 67*a* and a second end 67*b*). This universal joint 67 translates the rotation of the angled second steering wheel shaft 65 to a rotation about a vertical axis. A chain 69 meshingly engages the teeth of the first and second sprockets 64, 66. The first and second sprockets 64, 66 are preferably selected in such a manner as to provide a gear reduction: that is, sprocket 66 has a larger diameter than that of second sprocket 64. This reduces the turning force needed to turn the wheels 20, 30. It should be noted that, as stated, many embodiments of the steering linkage are possible, including direct drive connections without gear reduction.

With continuing reference to FIGS. 18, 19, 21, and 23, a steering cam shaft 680 is connected to the second end 67*b* of the universal joint 67. The steering cam shaft 680 has a first end 680*a* (connected to the second end 67*b* of the universal joint 67) and a second end 680*b* and an axis of rotation 680*c* about which the steering cam shaft 680 rotates. In this embodiment a third sprocket 640 and a fourth sprocket 650 are mounted at the second end 680*b* of the steering cam shaft 680. The third sprocket 640 receives chain 641 for engaging a first wheel sprocket 21. Similarly, the fourth sprocket 650 receives chain 651 for engaging a second wheel sprocket 31. Obviously it is recognized that a single sprocket and a single chain could be used in place of the third and fourth sprockets 640, 650 and chains 641, 651.

The first and second steerable front wheels 20, 30 are rotatably mounted about a horizontal axis to first and second wheel yokes 20*a*, 30*a*, respectively. The wheel yokes 20*a*, 30*a* are in turn rotationally mounted about a vertical axis to the frame 11 via first and second caster pivot mounts 20*b*, 30*b*. First and second wheel sprockets 21, 31 are mounted, respectively, to the first and second caster pivot mounts 20*b*, 30*b*. In this arrangement, a steering input at the steering wheel 62 rotates first and second sprockets 64, 66 via chain 69, which in turn rotates the universal joint 67. This in turn rotates third sprocket 640 which rotates first wheel sprocket 21 via chain 641, and fourth sprocket 650 which rotates second wheel sprocket 31 via chain 651.

Referring again to FIGS. 7 through 9, in this embodiment one or more idler sprockets 660 may be mounted to the frame 11 to provide tension to the chains 641, 651 (perhaps via spring mounts), or, alternatively, to provide adjustment means for proper alignment of the first and second front steerable wheels 20, 30. In this embodiment, idler sprockets 660 are pivotally mounted to the frame 11 via idler sprocket brackets 661. An idler sprocket adjustment device 662 is shown in the figures as a threaded adjustment, but many known means of adjustment for such devices are possible.

Figure 7:
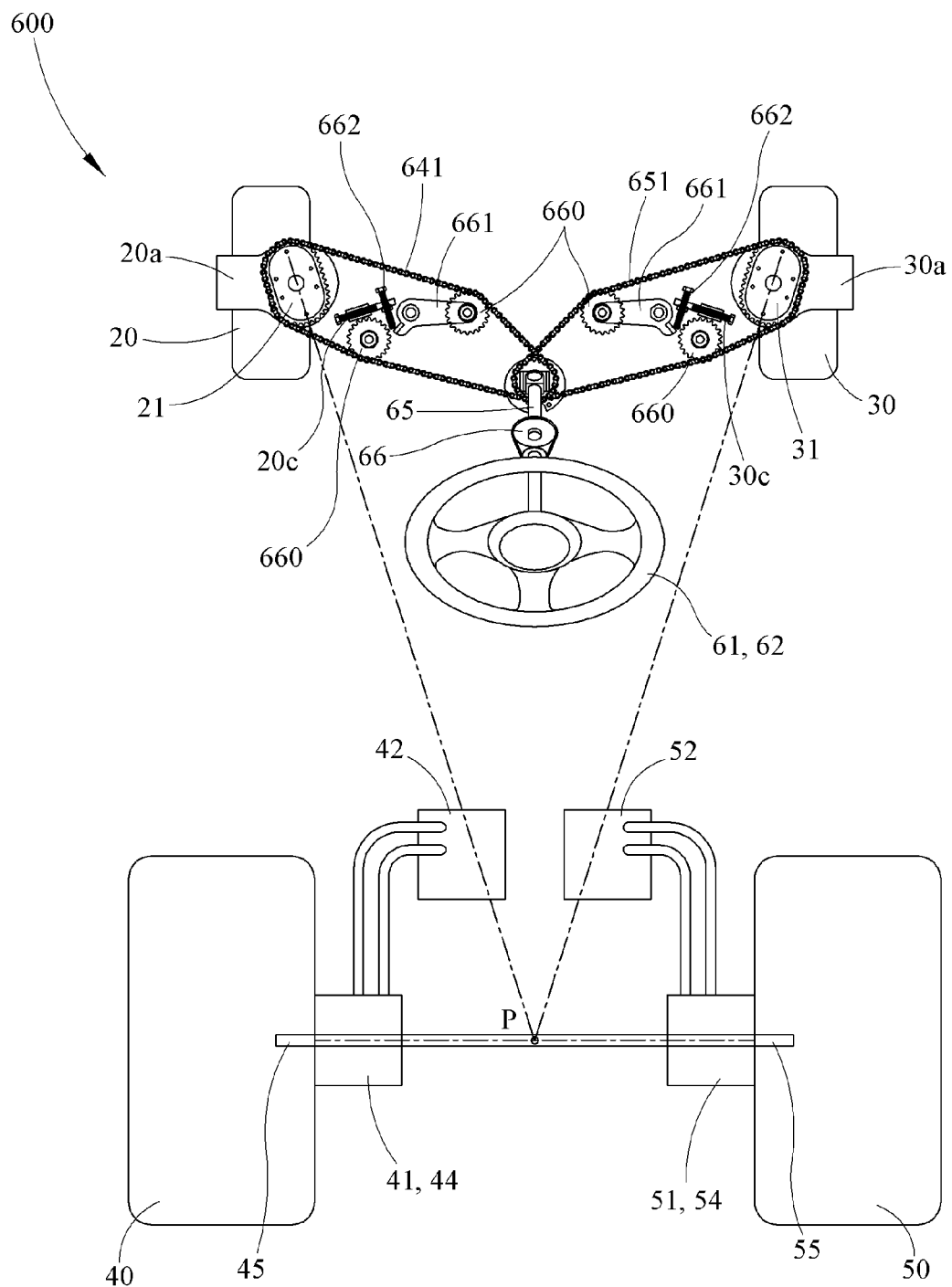
FIG. 7 is a schematic of a front wheel steering system according to a preferred embodiment, shown when the steering input is zero.
Figure 8:
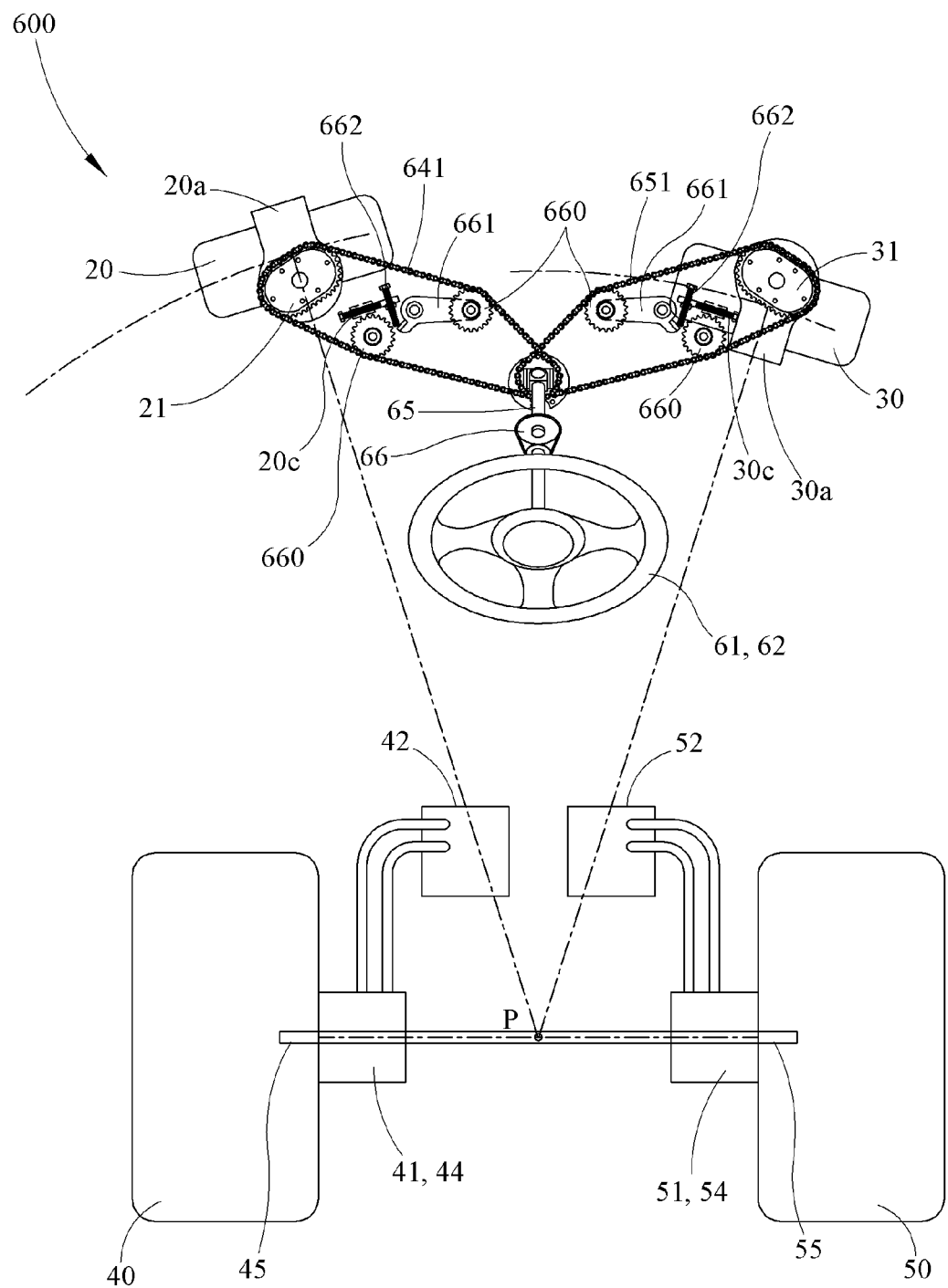
FIG. 8 is a schematic of the front wheel steering system shown in FIG. 6, shown when the steering input is high, indicating a right zero-radius turn.
Figure 9:
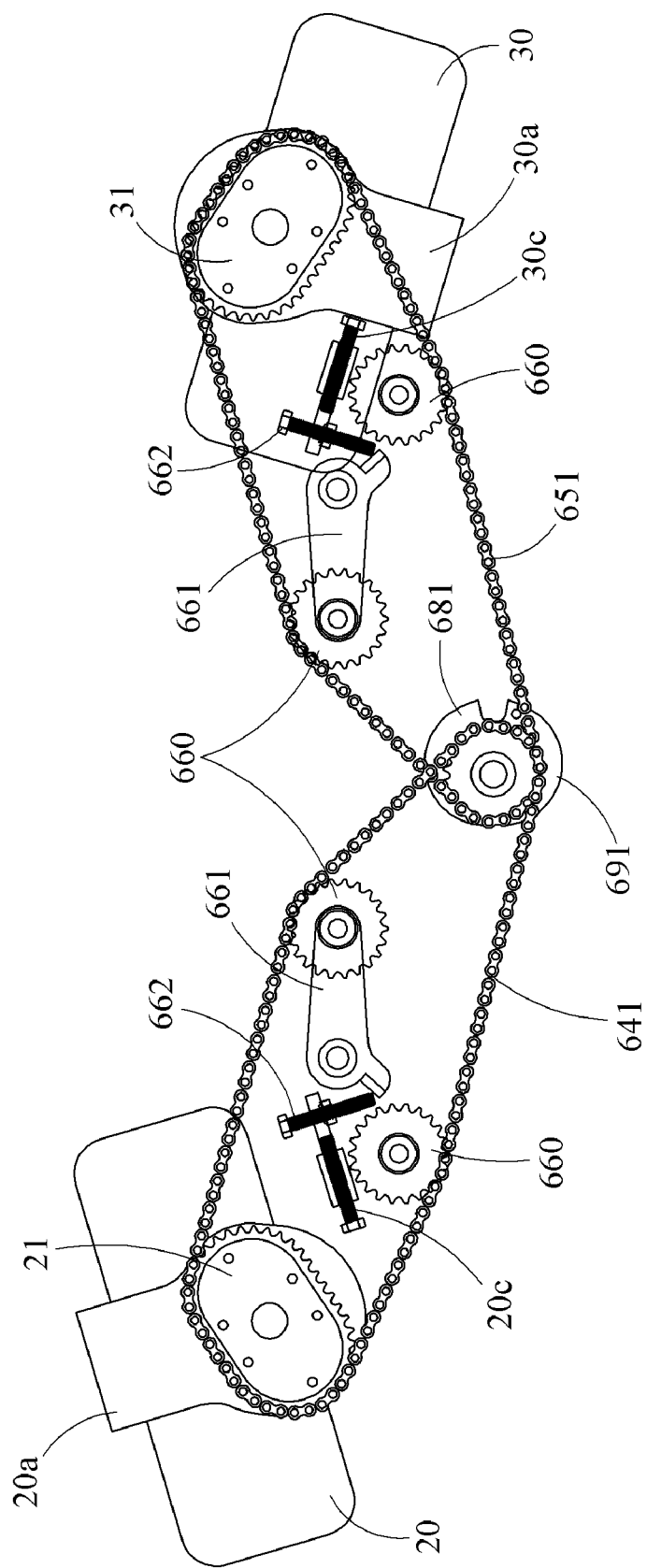
FIG. 9 is close-up schematic of the front wheel steering system shown in FIG. 8.
Figure 10:
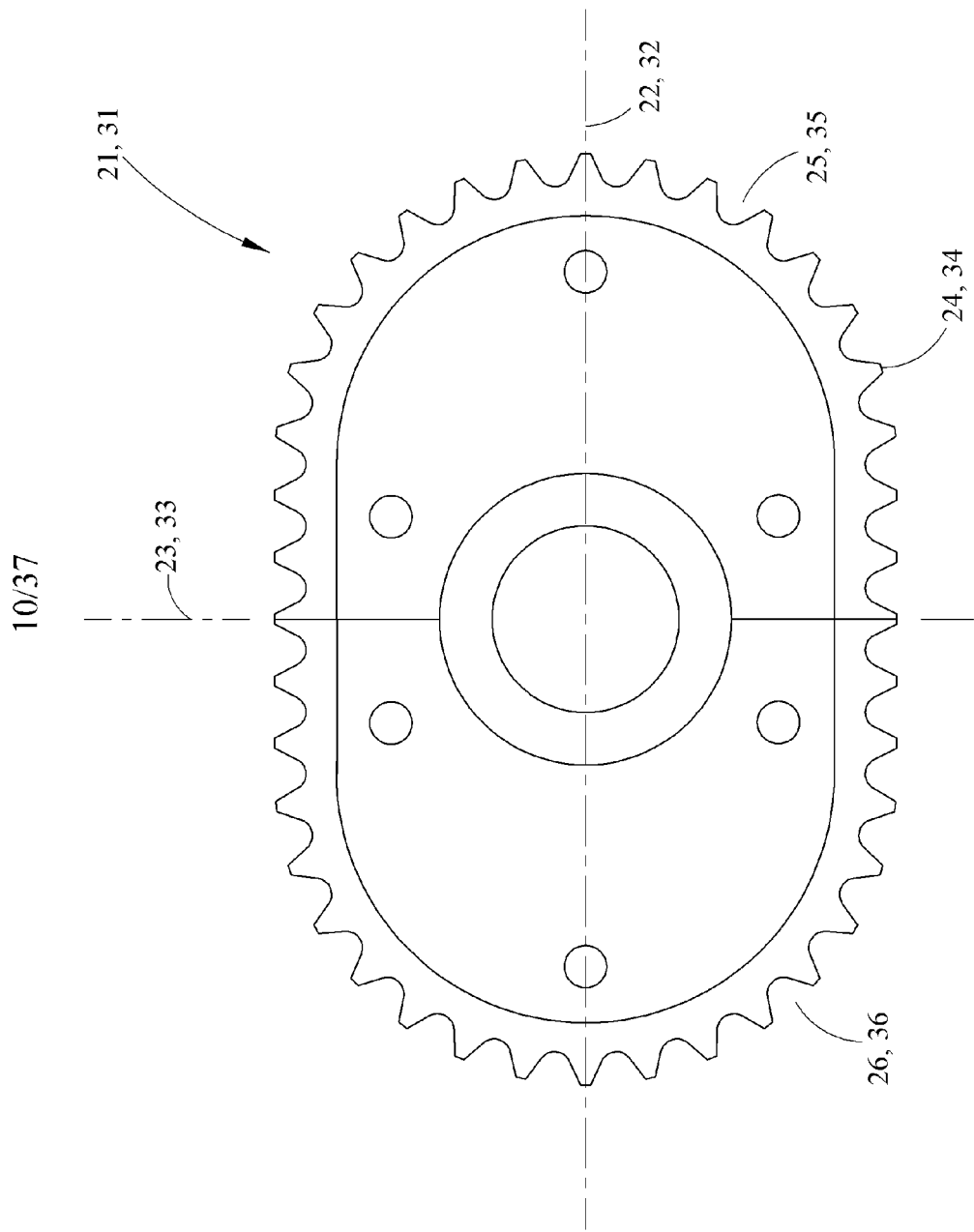
FIG. 10 is a top plan view of a first or second oblongated wheel sprocket according to a preferred embodiment.

Referring now to FIGS. 7 through 9 and to FIG. 10, the first and second wheel sprockets 21, 31 will be further described. The first wheel sprocket 21 is preferably noncircular, having a first axis 22 and a second axis 23. Many regular geometric shapes other than that shown in the figures are possible for the first wheel sprocket, including, without limitation, oblong, ovoidal, ellipsoidal, and so forth. Other non-regular geometric shapes are also possible, for example a substantially "I-shaped" member having curved ends separated by a connector. Likewise, a substantially "H-shaped" member having curved ends separated by more than one connector are possible, and so forth. The goal being to provide a sprocket with an outer perimeter 24 having at least two curved portions 25, 26 oppositely disposed, separated by a distance. All such designs shall be generically referred to as "oblongated". In the oblongated embodiment shown in the figures, the first wheel sprocket 21 is basically a rectangular member having two curved ends 25, 26 separated by a first axis 22 (a major axis) that is greater than the second axis 23 (a minor axis).

In similar fashion, second wheel sprocket 31 is preferably noncircular, having a first axis 32 and a second axis 33. Many regular geometric shapes other than that shown in the figures are possible for the first wheel sprocket, including, without limitation, oblong, ovoidal, ellipsoidal, and so forth. Other non regular geometric shapes are also possible, for example a substantially "I-shaped" member having curved ends separated by a connector. Likewise, a substantially "H-shaped" member having curved ends separated by more than one connector are possible, and so forth. The goal being to provide a sprocket with an outer perimeter 34 having at least two curved portions 35, 36 oppositely disposed, separated by a distance. All such designs shall be generically referred to as "oblongated". In the oblongated embodiment shown in the figures, the second wheel sprocket 31 is basically a rectangular member having two curved ends 35, 36 separated by a first axis 32 (a major axis) that is greater than the second axis 33 (a minor axis).

Using an oblongated sprocket design allows the vehicle 10 to achieve proper turning and to have proper alignment during all directions of travel. It allows the vehicle 10 to properly perform zero-radius turns without having one or both wheels "plough" or scrape the turf. This is possible with a proper orientation of the first and second wheel sprockets 21, 31. When the wheels 20, 30 are not turned at all (that is, when the steering input is zero), the major axes 22, 32 are oriented so that they intersect at the midpoint of the drive axle (labeled "P" in FIGS. 7 and 8).

Thus, when the steering wheel 62 is rotated in a clockwise or counterclockwise direction, the first and second wheel sprockets 21, 31, rotate accordingly. The chains 641, 651 translate the rotation of the steering wheel 62 to the first and second wheel sprockets 21, 31, respectively, causing the wheel yokes 20*a*, 30*a* to pivot in an amount relative to the rotation of the steering wheel 62. This causes the first and second steerable front wheels 20, 30 to turn at an angle relative to the rotation of the steering wheel 62.

In this embodiment, a mechanical stop 20*c*, 30*c* prevents the wheels 20, 30 from rotating too far. Because the vehicle 10 can perform zero-radius turns, the wheels 20, 30 are each capable of turning more than 90 degrees in the direction of their respective turn. In other words, if the first steerable front wheel 20 is a left front wheel, it needs to be capable of turning more than 90 degrees from the longitudinal axis of the vehicle 10 in a left turn. Likewise, if the second steerable front wheel 30 is a right front wheel, it must be capable of turning more than 90 degrees from the longitudinal axis of the vehicle 10 in a right turn. This is preferred in order to keep the steerable front wheels 20, 30 rotating in the turn and prevent them ploughing or scraping of the turf. Specifically, the preferred range of rotation for the first wheel 20 (considering a counterclockwise rotation to be positive) is approximately +108 degrees to approximately −72 degrees. Similarly, the preferred range of rotation for the second wheel 30 is approximately +72 degrees to approximately −108 degrees. With this geometry a zero-radius turn is performed without having either wheel 20, 30 plough or scrape the turf. Naturally, the degree of rotation allowed is dependent on various factors, including the size of the vehicle 10, the shape, alignment, and orientation of the first and second wheel sprockets 21, 31, and the position of the caster pivot mounts 20*b*, 30*b* with respect to the wheels 20, 30. Given these variables, it is conceivable that the range of rotation described above could be altered by +/−30 degrees or even more. So long as each wheel 20, 30 is angled at a tangent to its radius of rotation (shown at Point "P" in FIGS. 7 and 8), the proper geometry is achieved.

In this embodiment, it is seen that the wheels 20, 30 are rotated about a caster pivot 20*b*, 30*b*, respectively, that is located inwardly from the center of the wheels 20, 30. This allows lower turning forces to steer the wheels 20, 30. Also, by locating the wheels 20, 30 outboard of the frame 11, the tendency of the wheels 20, 30 to tear the turf while steering the vehicle at low speeds is significantly reduced in comparison to vehicles on which the front wheels are located onboard the frame.

To reiterate, the steering system provides a multistage steering input. This means that the steering can occur at the front wheels 20, 30 or at both the front wheels 20, and the drive wheels 40, 50. Contrary to known ZTR vehicles, steering of the vehicle 10 cannot occur only at the drive wheels 40, 50. The front wheel steering system 600 used to steer the steerable front wheels 20, 30 has just been described. Now attention will be turned to the system and mechanisms responsible for the second stage steering input Referring again generally to FIGS. 11-14 and 17-24, an engagement cam system 740 provides the mechanism whereby the steering device 61 can behave in a multistage fashion. An arm 720 is mounted to forward pedal pivot 710. The arm 720 includes an engagement cam roller 730. An engagement cam 741 is mounted to an engagement cam shaft 742. The engagement cam 741 comprises a first surface 741*a* and a second surface 741*b* (see FIGS. 12, 14A, 14B, and 14C). Preferably the second surface 741*b* is disposed at an angle (from vertical) in the forward direction with respect to the first surface 741*a*. As discussed above, when the forward pedal 71 is depressed, it rotates forward pedal pivot 710 and moves first forward link 711 forward. This rotates forward control shaft 712 forward via arm 713 and tab 714 to provide forward power to the drive wheels 40, 50 via second forward link 715. However, when the forward pedal 71 is depressed, it also rotates the engagement cam shaft 742 forward. This is accomplished by the arm 720 and the engagement cam roller 730. Arm 720 is connected to the forward pedal pivot 710. This movement is shown in FIGS. 14A, 14B, and 14C. FIG. 14A shows the situation when the forward pedal 71 has been slightly depressed to bring the engagement cam roller 730 into contact with the first surface 741*a* of the engagement cam 741. Once this occurs, any additional activation of the forward pedal 71 results in rotation of the engagement cam shaft 742 because the engagement cam roller 730 moves along the first surface 741*a* of the engagement cam 741 (see FIG. 14B). Once the engagement cam roller 730 reaches the junction of the first surface 941*a* and the second surface 941*b* of the engagement cam 941, additional activation of the forward pedal 71 (see FIG. 14C) does not further rotate the engagement cam shaft 742. Rather, it merely results in increased ground speed. When the forward pedal 71 is depressed, this rotates arm 720 forward, which makes engagement cam roller 730 move along the first surface 741*a* and the second surface 741*b* of the engagement cam. The purpose of the angle between the first surface 741a and the second surface 741b is to provide a relief point wherein once the engagement cam roller 730 begins movement along the second surface 741b, no further rotation of the engagement cam shaft 742 occurs. This will be described below.

Referring now to FIG. 11 in conjunction with FIGS. 17-24, a first cam follower 750 having a first end 750a and a second end 750b is pivotally mounted at its first end 750a to the frame 11. Similarly a second cam follower 755 having a first end 755a and a second end 755b is pivotally mounted at its first end 755a to the frame 11 at the same location as first cam follower 750. A first bearing 780 is movably mounted to the first cam follower 750 and a second bearing 790 is movably mounted to the second cam follower 755. The first and second cam followers 750, 755 and the first and second bearings 780, 790 serve to selectively and independently link the steering device 61 to the drive wheel locomotion system 700, as will be described in greater detail below.

Referring now to FIGS. 17 and 25-31, it is seen that the first and second push cables 760, 770 have their housings 760c, 770c connected to the gusset plate 765. The first ends 760a, 770a of the first and second push cables 760, 770 are connected to the first and second cam followers, 750, 755, respectively. Preferably, a spring 762 is mounted between the gusset plate 765 and the second end 760b of the first push cable 760 to keep a biasing force between the gusset plate 765 and the first cam follower 750. Similarly, a spring 772 is mounted between the gusset plate 765 and the second end 770b of the second push cable 770 to keep a biasing force between the gusset plate 765 and the second cam follower 755.

Depressing the forward pedal 71, as described above, rotates both the forward control shaft 712 and the engagement cam shaft 742, via the various components described (see FIG. 11). Because the gusset plate link 766 directly connects the gusset plate 765 to the engagement cam shaft 742, rotation of the engagement cam shaft 742 also rotates the gusset plate 765 to a forward position. In this forward position the first and second cam followers 750, 755 are brought into a position where they can independently receive, in surface contact relationship, the first and second steering cams 681, 691, respectively.

Referring generally to FIGS. 17-24, the first steering cam 681 is mounted on a first portion of the steering cam shaft 680. The second steering cam 691 is mounted on a second portion of the steering cam shaft 680. Both the first steering cam 681 and the second steering cam 691 are preferably, but not necessarily, disk-like in nature, having a relatively planar disklike shape. Each steering cam 681, 691 comprises an outer perimeter or at least a portion of an outer perimeter that defines a surface 682, 692 having a rotationally increasing radius from the center 680a of the steering cam shaft 680. The surface 682, 692 is preferably akin to a spiral where each point along the perimeter is located farther away from the center 680a than a previous point. Specifically, the first steering cam 681 is mounted on steering cam shaft 680 so that a counterclockwise rotation of the steering wheel 62 (indicating a left steering input) rotates an increasing radius of the outer surface 682 into increasing engagement with the first bearing 780. As this occurs, first bearing 780 and first cam follower 750 begin to move backwards, thus causing first push cable 760 to push the pump arm 46 in a rearward direction. This slows the speed of the first drive wheel 40, which is the inside wheel in a left steering input.

Similarly, the second steering cam 691 is mounted on steering cam shaft 680 so that a clockwise rotation of the steering wheel 62 (indicating a right steering input) rotates an increasing radius of the outer surface 692 into increasing engagement with the second bearing 790. As this occurs, second bearing 790 and second cam follower 755 begin to move backwards, thus causing second push cable 770 to push the pump arm 56 in a rearward direction. This slows the speed of the second drive wheel 50, which is the inside wheel in a right steering input. Depending on manufacturing tolerances and component set up, second steering cam 691 may need to be offset slightly from 0 degrees with respect to the first steering cam 681.

Referring now to FIGS. 15 and 16, a reverse input 80 comprises in this embodiment a reverse pedal 81. The reverse pedal 81 is rotatably mounted to the frame 11 via a reverse pedal pivot 82 in a location easily accessible to the user. The reverse pedal pivot 82 is connected to a first reverse link 83 at a first end 83a thereof. A second end 83b of the first reverse link 83 is connected to a reverse linkage shaft 84. The reverse linkage shaft 84 is pivotally connected to the frame 11. A second reverse link 85 has a first end 85a and a second end 85b. The first end 85a of the second reverse link 85 is connected to the reverse linkage shaft 84. The second end 85b of the second reverse link 85 is connected to each pump arm 46, 56 on the pump forward control assembly 480 at a location thereon that is on a side opposite its axis of rotation 480c. In this manner, when the reverse pedal 81 is depressed, first reverse link 83 pivots the reverse linkage shaft 84 in a manner that moves second reverse link 85 in a forward direction, but the forward motion of second reverse link 85 rotates the pump arms 46, 56 and swash plates 47, 57 in a rearward direction, equally. Obviously the magnitude of the reverse speed can be adjusted by altering the pivot location of the second reverse link 85 with respect to the pump forward control assembly 480. Pump control springs 483, 484 are provided to return the pump arms 46, 56 to neutral. Magnetic sensing proximity switches 485, 486 are also provided to sense neutral position for safety.

Figure 26:
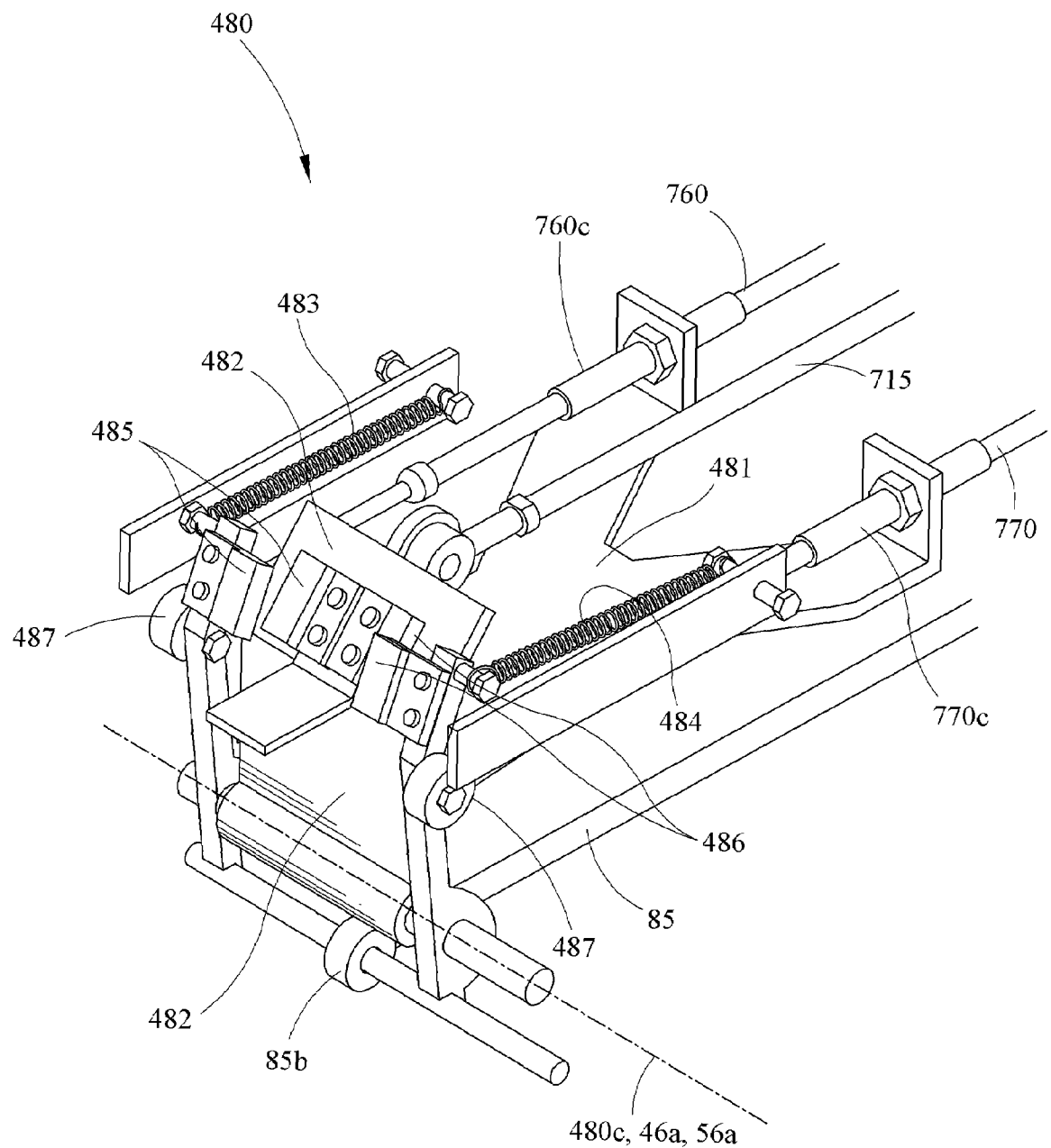
FIG. 26 is a perspective view of the pump forward control assembly shown in FIG. 25 where a reverse input has been made indicating the vehicle is in reverse.

Referring additionally to FIGS. 25 and 26, the backward motion of the pump arms 46, 56 likewise causes the swash plates 47, 57 to move backward in relation to the amount of reverse input the operator applies via the reverse pedal 81. This causes power to be applied to the drive wheels 40, 50 in the reverse direction in an amount proportional to the reverse input applied by the operator. In this embodiment, because the reverse input 80 is not connected to the engagement cam shaft 742, depression of the reverse pedal 81 does not allow differing speeds of the drive wheels 40, 50 in reverse. Therefore, when the vehicle 10 is operated in reverse, steering is accomplished through the turning of the first and second steerable front wheels 20, 30 only. Further, in this embodiment, the reverse direction is favored over the forward direction such that if both the forward pedal 71 and the reverse pedal 81 are depressed simultaneously, the swash plates 47, 57 will tilt backward, and power will be applied to the drive wheels 40, 50 in the reverse direction. This is possible since the second reverse link 85 is connected directly to the pump arms 46, 56, while the second forward link 715 is connected to the pump forward control assembly 480 via independent rotational linkage 487. This feature is a safety mechanism for emergency situations in which an operator may need to immediately stop or reverse the apparatus 10. It is feared that in such a situation, a panicked operator might depress both the forward and reverse pedals 71, 81 simultaneously. Therefore, in such a situation, the reverse pedal 81 and its associated linkage is designed to override the forward pedal 71, allowing the operator to reverse away from the dangerous situation.

Figure 27:
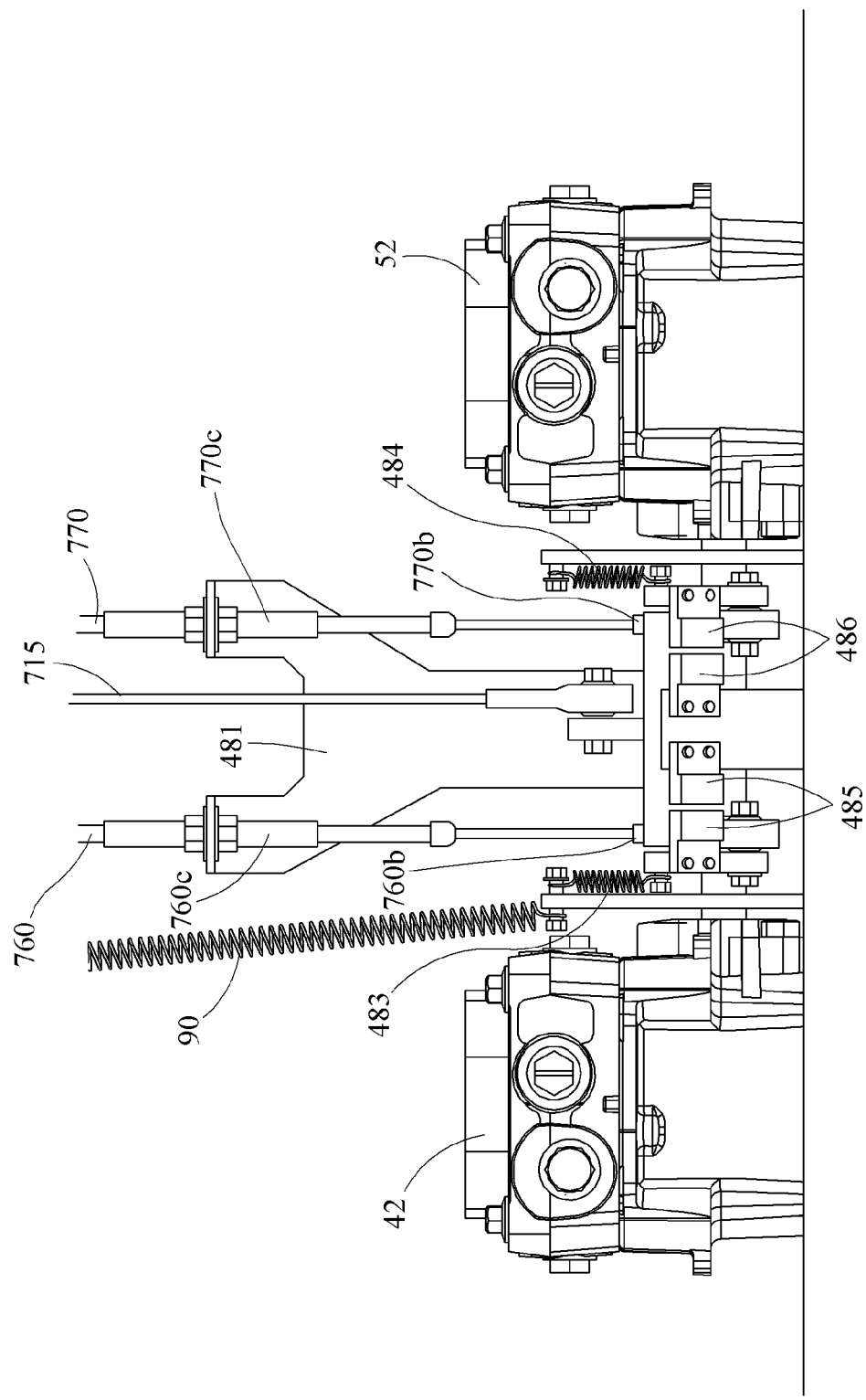
FIG. 27 is a top view of the pump forward control assembly shown in FIG. 26.
Figure 28:
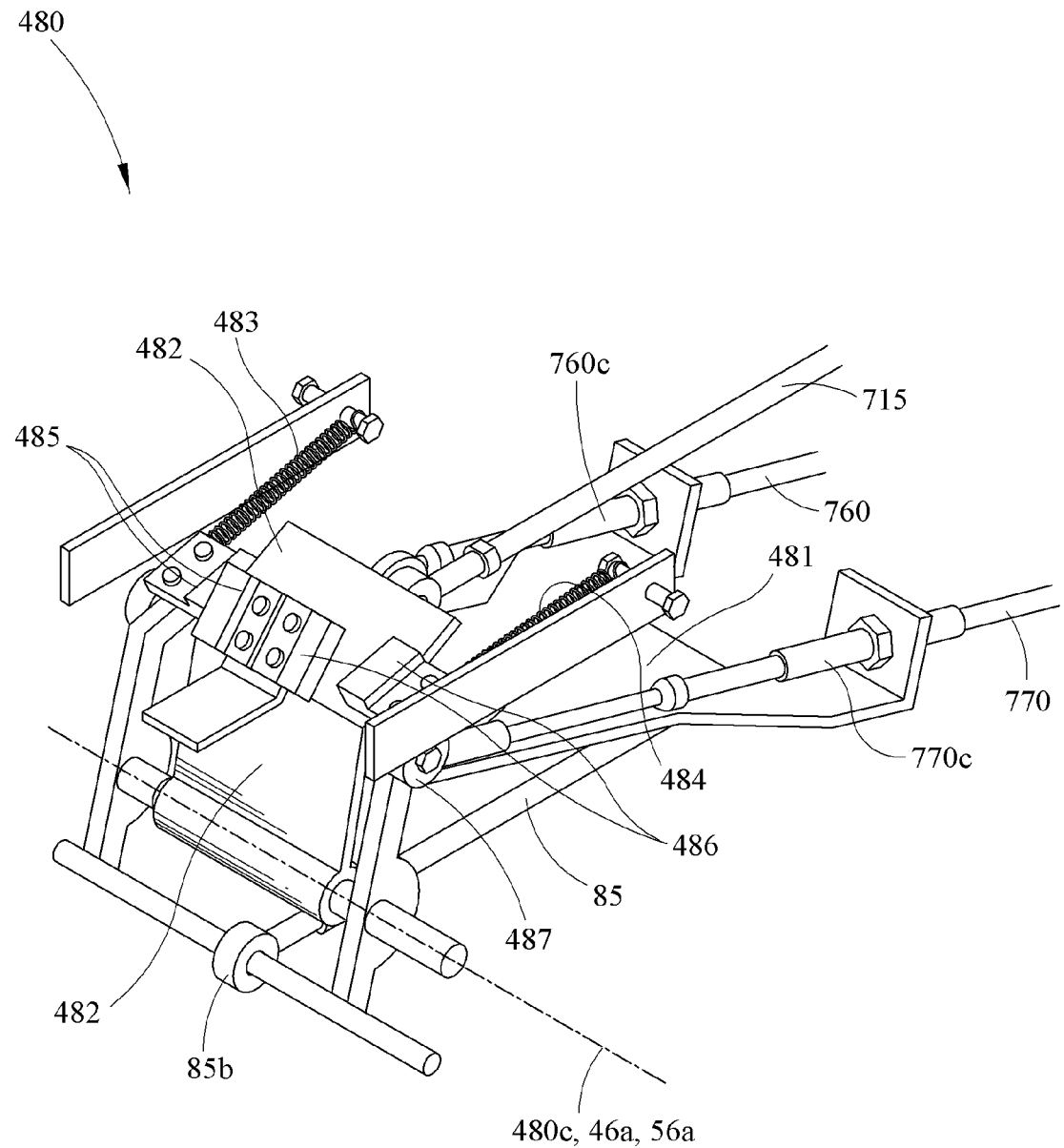
FIG. 28 is a perspective view of the pump forward control assembly shown in FIG. 25 where a forward input has been made indicating the vehicle is in moving straight forward, with no steering input.
Figure 29:
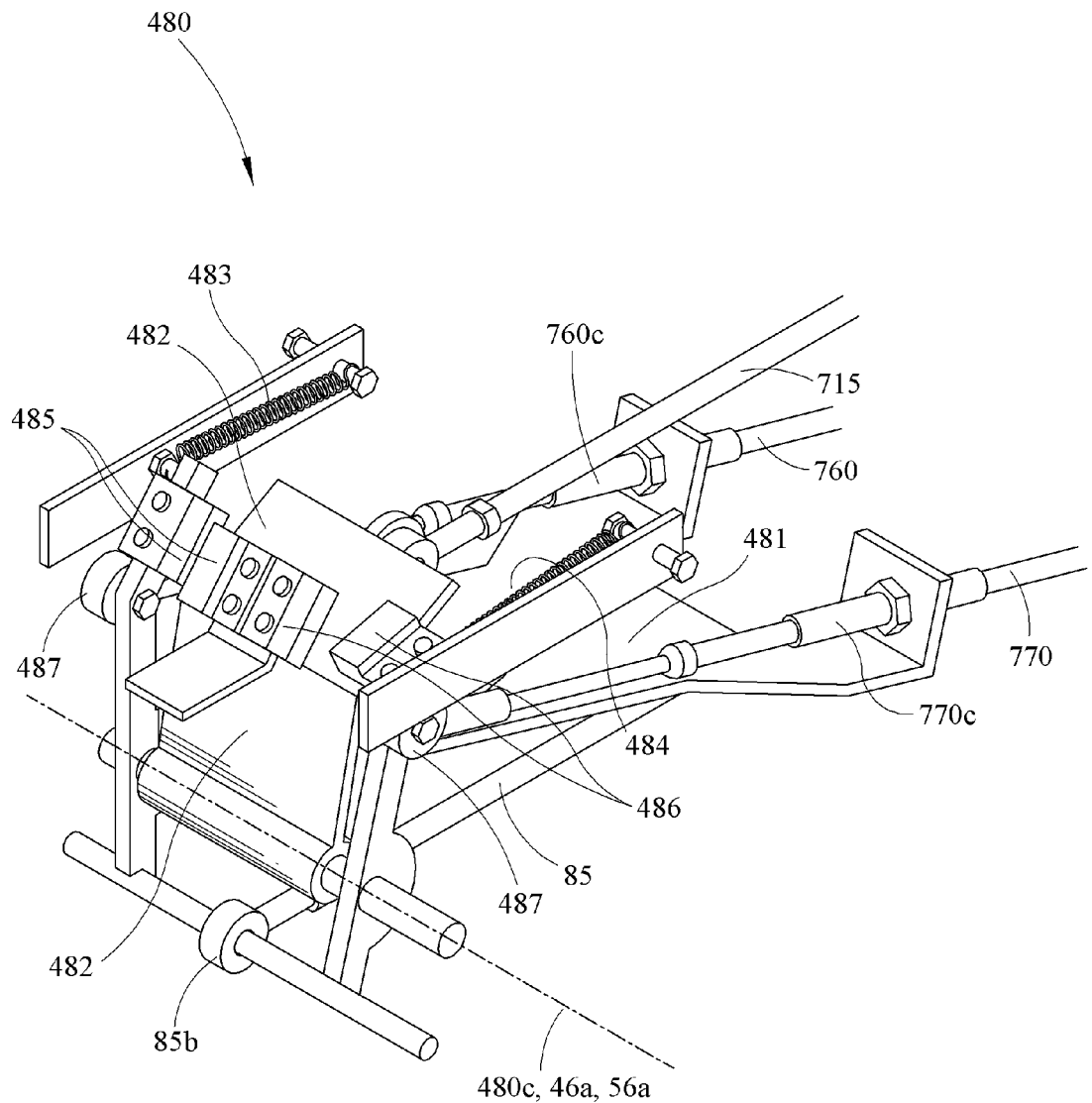
FIG. 29 is a perspective view of the pump forward control assembly shown in FIG. 28 where a steering input has been made indicating a left turn.
Figure 30:
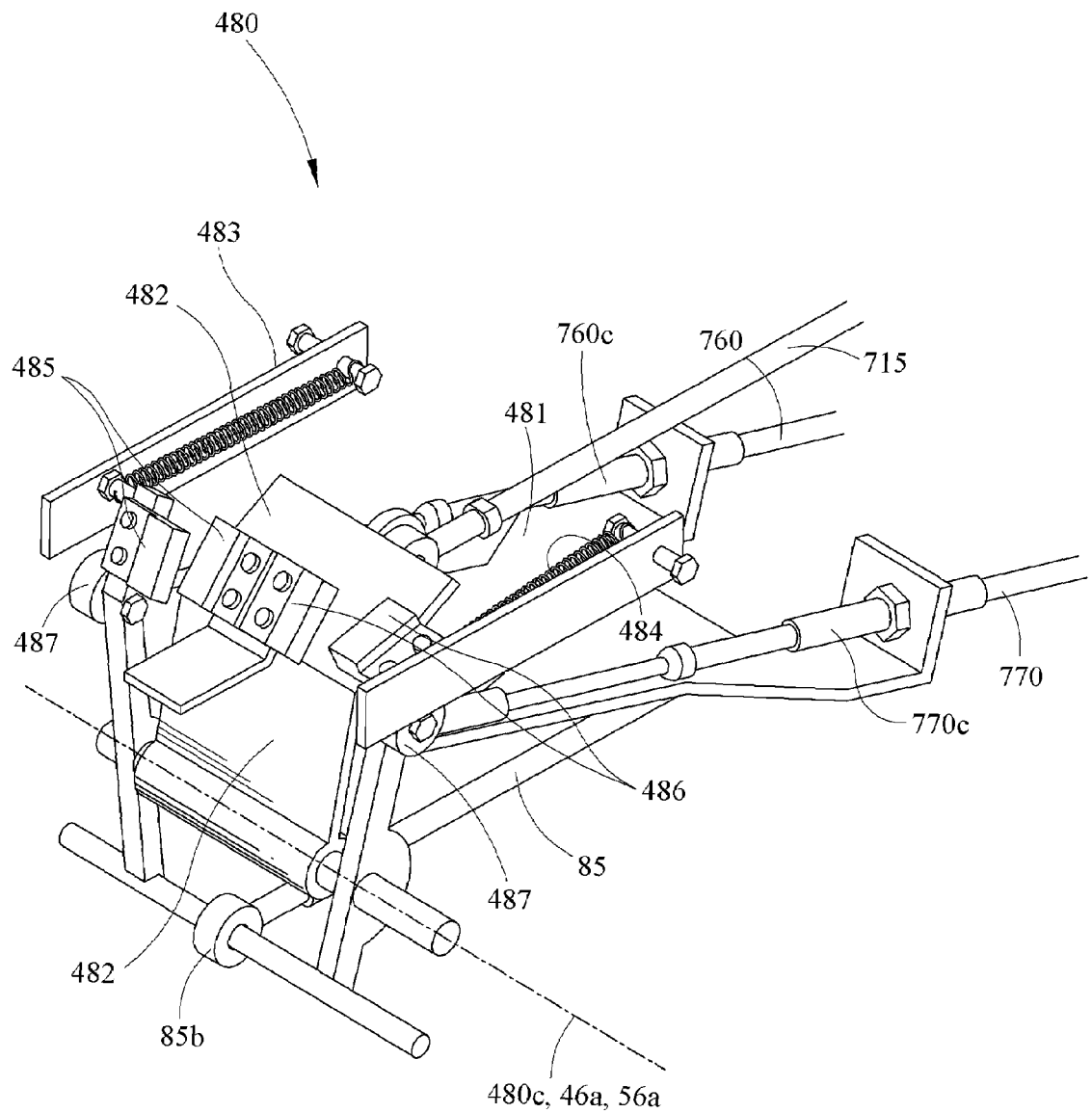
FIG. 30 is a perspective view of the pump forward control assembly shown in FIG. 29 where a high left steering input has been made indicating a zero-radius turn in a counter-clockwise direction.

Having described the vehicle according to one preferred embodiment, a summary of its operation in various modes is now provided. Reference is now also made to FIGS. 25-31 which show the positions of the pump arms 46, 56 and associated structures in various modes of operation of the vehicle 10. FIGS. 25 and 27 show the vehicle 10 at rest, that is in neutral with no steering input applied. FIG. 26 shows the vehicle 10 in reverse. As described, the vehicle 10 provides zero turn radius steering capability via a multistage steering system.

At slow speeds with little or no steering input, the forward control shaft 712 has been rotated only slightly and does not move the engagement cam shaft 742 forward sufficiently to place the first and second bearings 780, 790 (via the first and second cam followers 750, 755) close enough to the first and second steering cams 681, 691 so as to make contact therebetween. At such low steering input, even though the outer surfaces 682, 692 rotate close to the first and second bearings 780, 790, they do not make contact (see FIG. 19). As a result, turning the steering wheel 72 (either counterclockwise for a left turn or clockwise for a right turn) slightly (for small steering input) does not move the first or second bearings backward (recall that the first ends 760a, 770a of the first and second push cables 760, 770 are connected to the cam followers 750, 755). This means that the drive wheels 40, 50, via pump forward control assembly 480, continue to rotate at equivalent forward speeds. This also means that any turning of the vehicle 10 is performed via the front wheel steering system 600, with its associated structures including, e.g., the first and second steering shafts 63, 65, the various sprockets 64, 66, 640, 650, and the oblongated sprockets 21, 31.

At slow speeds with high steering input, however, the engagement cam system 740 is activated in such a manner as to provide a zero-radius turn. At slow speeds, as just described, the first and second cam followers 750, 755 are moved forward only slightly. However, the outer surfaces 682, 692 comprise portions thereon that contain sufficiently large increases in radius from the axis of rotation 680c. This means that when the steering input is high, such as when it is at a maximum amount indicating a zero-radius turn (see FIG. 21), the outer surfaces 682, 692 are able to make contact with the first or second bearings 780, 790, respectively, to move the pump arm 46, 56 of the inside wheel in a backward direction. Thus, even at low speeds, the vehicle 10 is capable of performing zero-radius turns.

In reverse the vehicle 10 similarly is steered only via the front wheel steering system 600, but the vehicle 10 uses different systems for this. Referring to FIG. 26, the reverse pedal 81 is connected to a reverse linkage shaft 84 via reverse pedal pivot 82 and first reverse link 83. Depressing the reverse pedal 81 moves first reverse link 83 forward, which rotates pump arms 46, 56 and swash plates 47, 57 backward, in equal amounts. Because the reverse linkage shaft 84 has no connection to the engagement cam shaft 742, depressing the reverse pedal 81 does not bring the first and second cam followers into proximity with the first and second steering cams, and, for similar reasons as just stated, no separate, independent backward movement of pump arms 46, 56 is allowed.

At moderate to high forward speeds, however, the steering wheel 72 is capable of both steering the steerable front wheels 20, 30 via the front wheel steering system 600 and providing separate, independent backward motion of the pump arms 46, 56. The system providing this capability is the engagement cam system 740. When the user depresses the forward pedal 71, the forward pedal pivot 710 rotates forward, moving first forward link 711 forward. This causes two shafts to rotate forward: the forward control shaft 712 and the engagement cam shaft 742, each with different results, described below.

Figure 21:
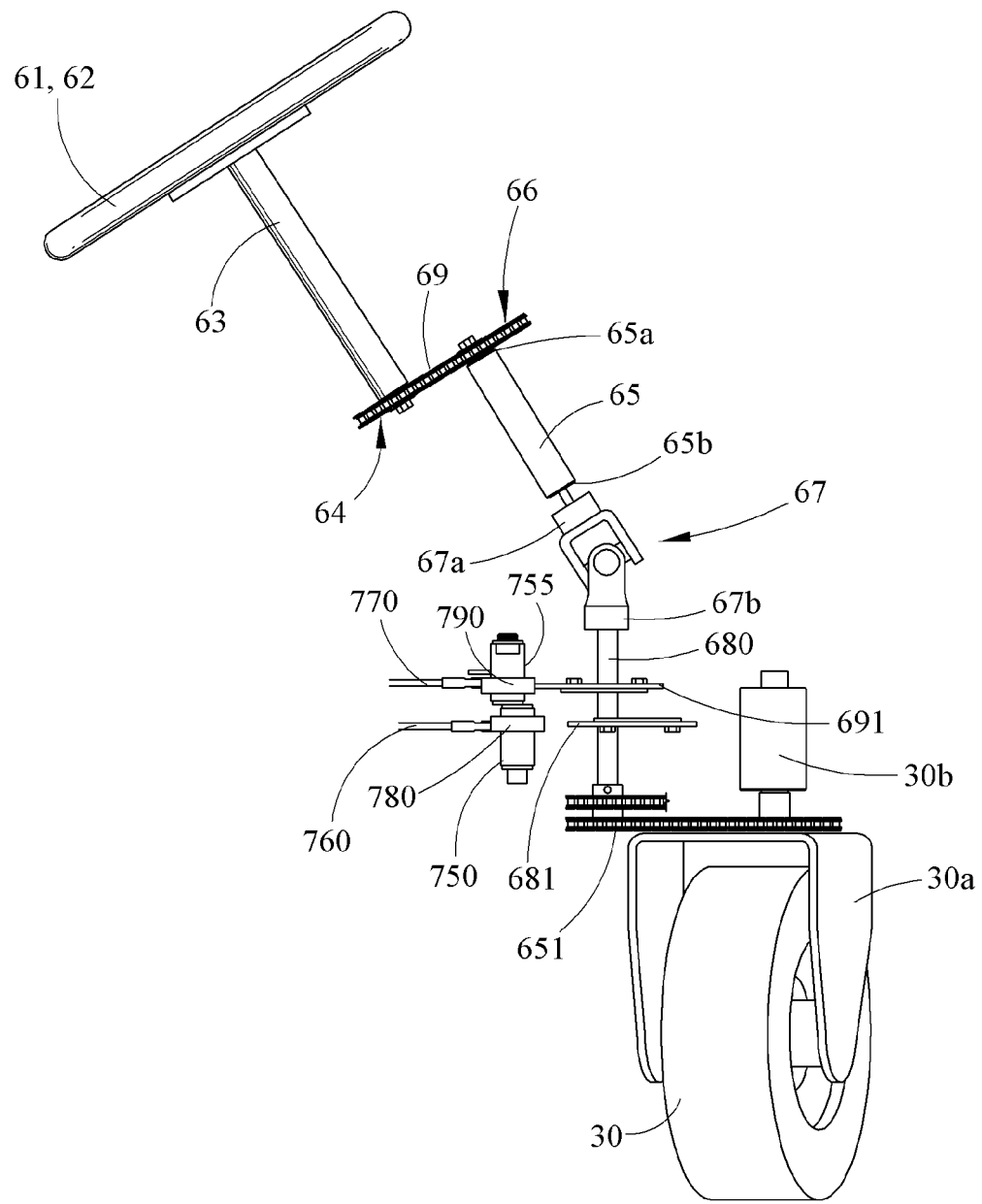
FIG. 21 is a partial right side elevation view of steering system shown in FIG. 19 shown during a high steering input indicating a zero-radius right turn.
Figure 22:
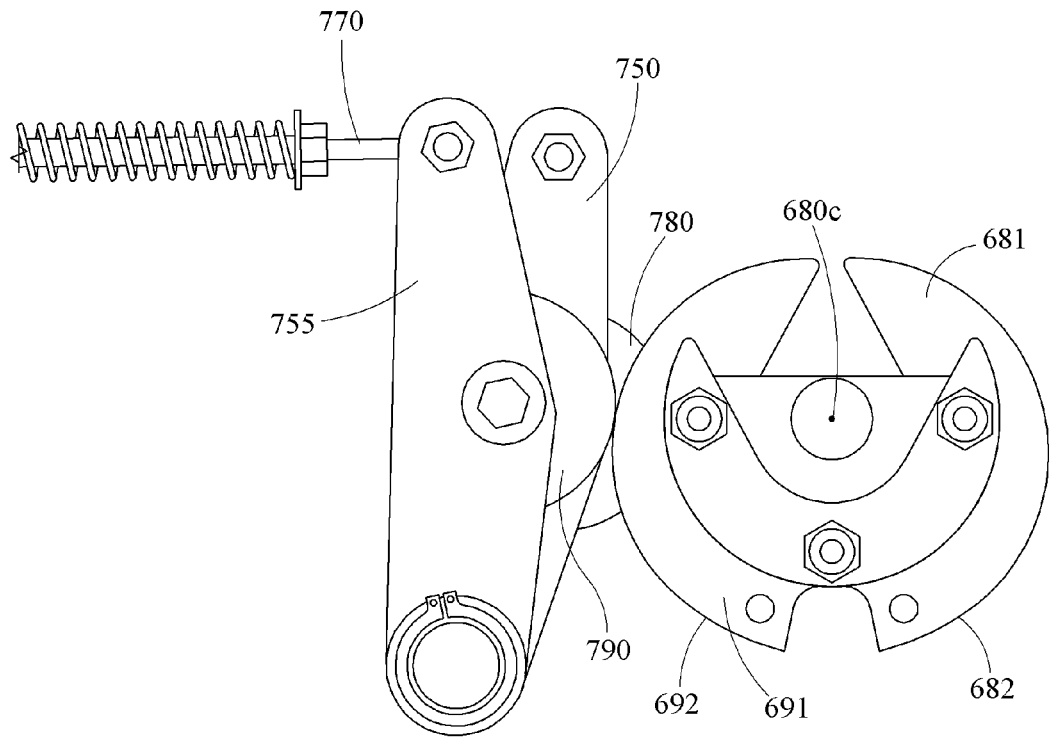
FIG. 22 is a top view of a portion of an engagement cam system as shown in FIG. 20 where a steering input indicating a right turn has been made, forcing the second bearing backward.
Figure 23:
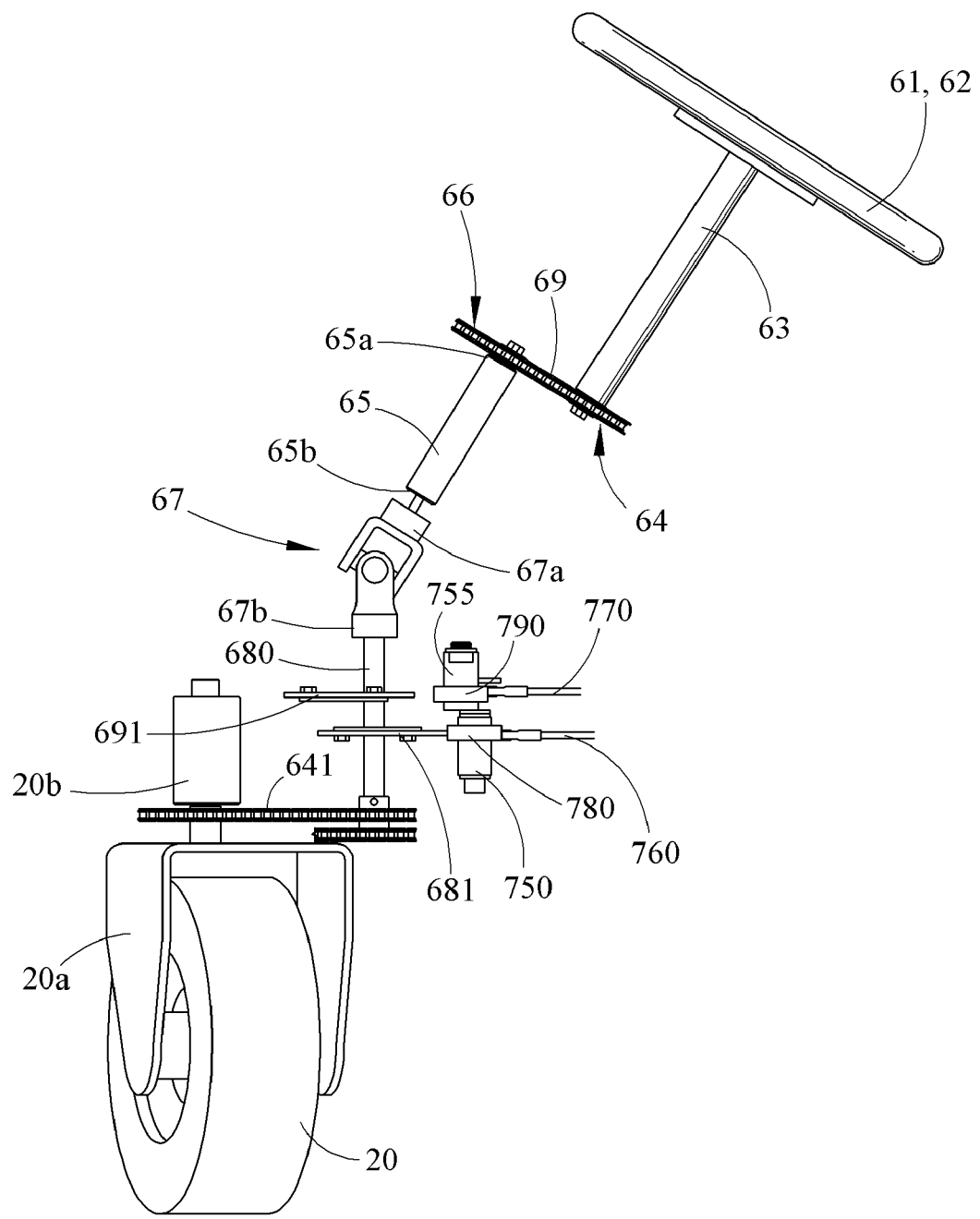
FIG. 23 is a partial left side elevation view of a steering system according to a preferred embodiment shown during a high steering input indicating a zero-radius left turn.
Figure 24:
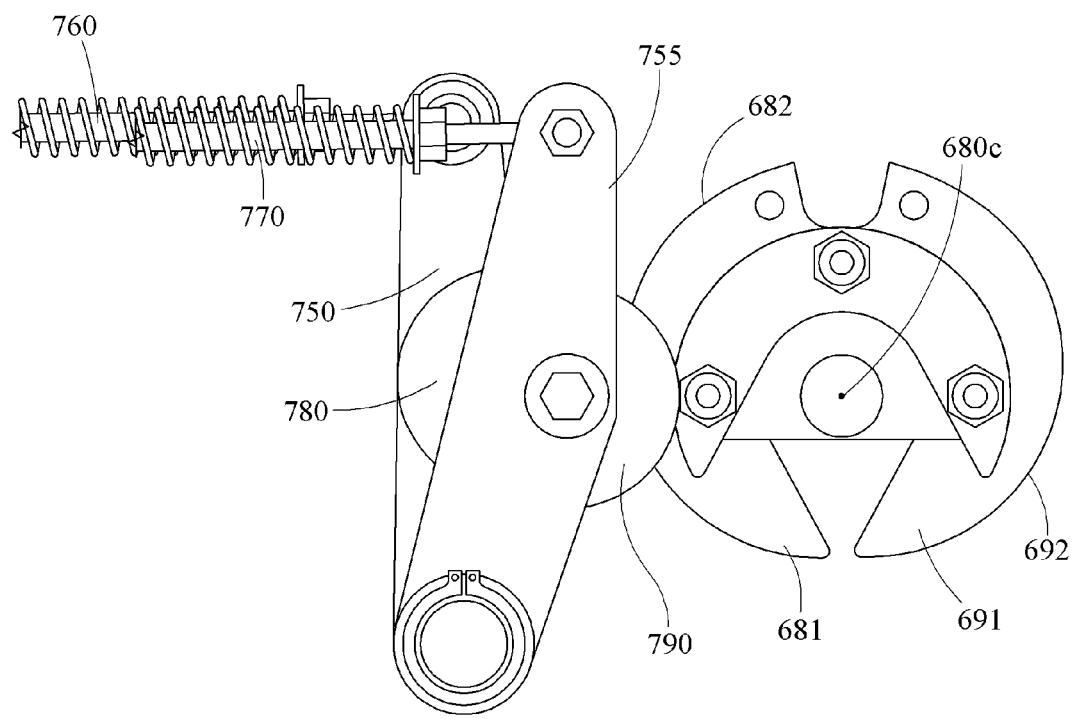
FIG. 24 is a top view of a portion of an engagement cam system as shown in FIG. 20 where a steering input indicating a left turn has been made, forcing the first bearing backward.

FIGS. 23 and 24 show the relative positions of the components during a left steering input. FIGS. 21 and 22 shown the positions of the components during a right steering input. Now with reference to FIGS. 12, 13, 14A, 14B, and 14C, it is seen that first the forward control shaft 712 rotates forward via its connection to first forward link 711. This in turn moves the second forward link 715 forward since it is also connected to the forward control shaft 712. Because the second forward link 715 is connected to the pump forward control assembly 480, the forward movement of the second forward link 715 causes rotation of the pump forward control assembly 480 about its axis of rotation 480c. Because the first and second pump arms 46, 56 are connected to rotate in equal amounts by rotation of the pump forward control assembly, each pump arm 46, 56 is rotated forward in equal amounts, causing each drive wheel 40, 50 to rotate at the same speed in a forward direction, causing straight forward travel.

Second, the engagement cam shaft 742 rotates forward via arm 720. This occurs because the engagement cam roller 730 contacts the first surface 741a of the engagement cam 741 (see FIG. 14A). As the engagement cam shaft 742 is rotated (see FIG. 14B), it moves the gusset plate 765 forward via gusset plate link 766. Because the housings 760c, 770c of the first and second push cables 760, 770 are stiffly connected to the gusset plate 765 and are also connected to the first and second cam followers 750, 755 at their first ends 760a, 770a, this forward movement moves the first and second cam followers 750, 755 forward. The engagement cam shaft 742 continues to rotate forward upon further pressing of pedal 71 until the cam 741 has rotated into such position that the engagement cam roller 730 moves from contacting the first surface 741a to contacting the second surface 741b (see FIG. 14C). In this manner, continued pressing of the pedal 71 can continue to rotated the forward control shaft 712 (thus continuing to increase ground speed of the vehicle 10) without further altering the position of the first and second cam followers 750, 755 with respect to the first and second steering cams 681, 691. In effect the design of the engagement cam 741 can be seen to provide a maximum limit of forward travel for the first and second cam followers 750, 755. Between the neutral position and the position of maximum travel for the first and second cam followers 750, 755, the followers 750, 755 allow a variable amount of steering cam contact between the first and second bearings 780, 790 and the first and second steering cams 681, 691, respectively.

From the discussion above regarding slow speeds, it is seen that at a range of low speeds with little or no steering input, the rotation of the engagement cam shaft 742 does not move the first and second cam followers 750, 755 close enough for the first and second bearings 780, 790 to be contacted by the first and second steering cams 681, 691. However, at more moderate speeds, or at higher steer input, or at a combination of higher speeds and more steer input, once the first and second cam followers 750, 755 have moved in a sufficient amount, steering input can then selectively alter the speed of one drive wheel with respect to the other drive wheel.

Specifically, referring again to FIGS. 23, 24, and 29, if a left turn is made by the user (by turning the steering wheel 72 counterclockwise), the steering cam shaft 680 rotates the first steering cam 681 counterclockwise so that an increasingly larger outer surface 682 contacts the first bearing 780. Because the steering cam shaft 680 does not translate (it only rotates), the increasingly larger outer surface 682 that is rotated onto the first bearing 780 has the effect of pushing the first bearing 780 (and therefore also first cam follower 750) backward. The more steering input applied, the farther backward the first bearing 780 is pushed. This pushing causes the first push cable 760 to rotatingly push the pump arm 46 backward in an amount proportional to the amount of the steering input (See FIG. 29). As the pump arm 46 is rotated backward, the speed it applies to the first drive wheel 40 is decreased. As additional steering input up to a maximum steering input is applied, the pump arm 46 continues to rotate backward (indicating continually reducing speed for first drive wheel 40), and then moves beyond neutral into reverse (see FIG. 30). At maximum steering input, the vehicle 10 is able to achieve a zero-radius turn in the counterclockwise direction.

Figure 31:
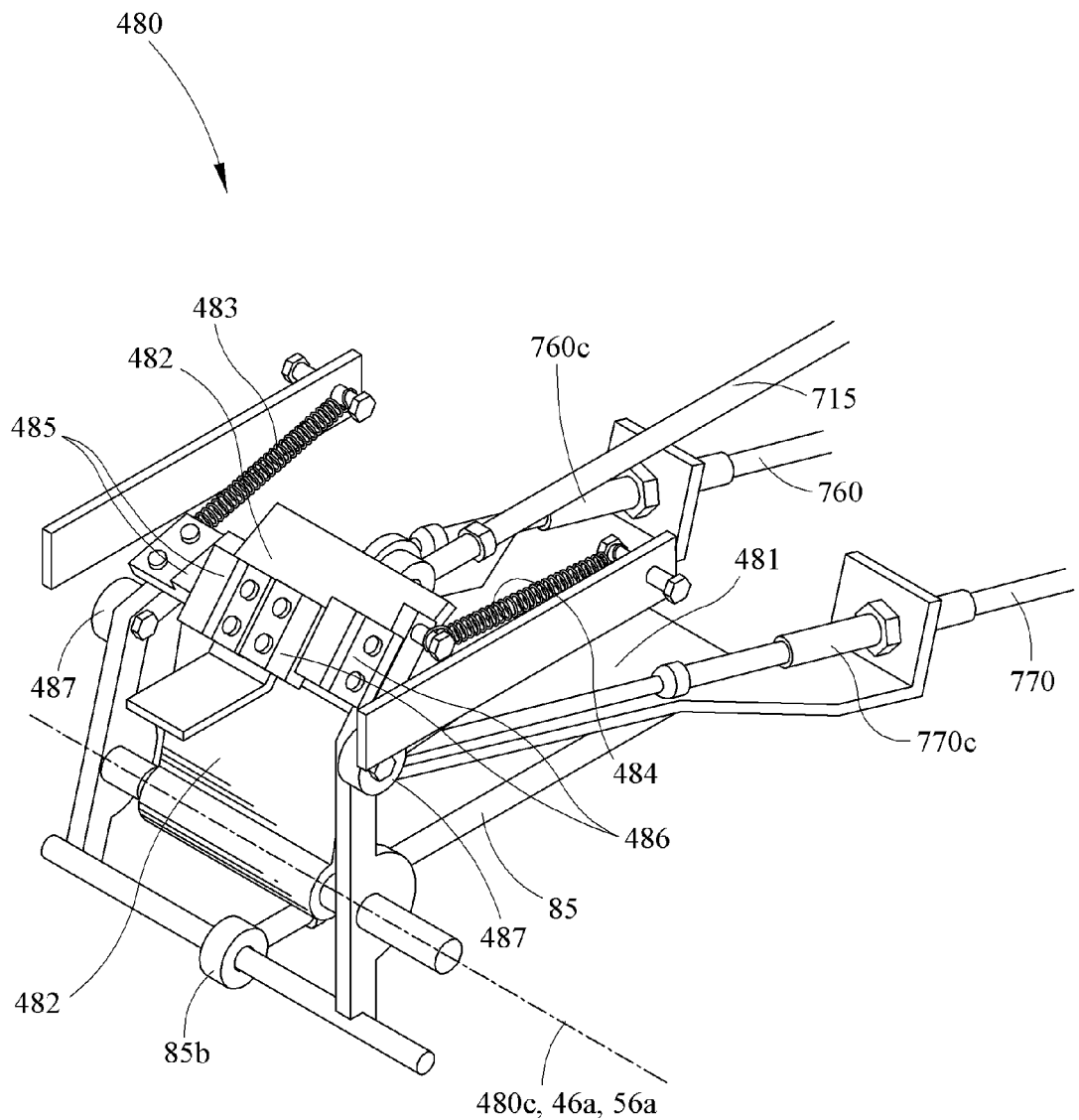
FIG. 31 is a perspective view of the pump forward control assembly shown in FIG. 28 where a steering input has been made indicating a right turn.

Similarly, referring to FIGS. 21, 22, and 31, if a right turn is made by the user (by turning the steering wheel 72 clockwise), the steering cam shaft 680 rotates the second steering cam 691 clockwise so that an increasingly larger outer surface 692 contacts the second bearing 790. Because the steering cam shaft 680 does not translate (it only rotates), the increasingly larger outer surface 692 that is rotated onto the second bearing 790 has the effect of pushing the second bearing 790 (and therefore also second cam follower 755) backward (see FIG. 22). The more steering input applied, the farther backward the second bearing 790 is pushed. This pushing causes the second push cable 770 to rotatingly push the pump arm 56 backward in an amount proportional to the amount of the steering input. As the pump arm 56 is rotated backward, the speed it applies to the second drive wheel 50 is decreased (see FIG. 31). As additional steering input up to a maximum steering input is applied, the pump arm 56 continues to rotate backward (indicating continually reducing speed for second drive wheel 50), and then moves beyond neutral into reverse. At maximum steering input, the vehicle 10 is able to achieve a zero-radius turn in the clockwise direction.

Figure 32:
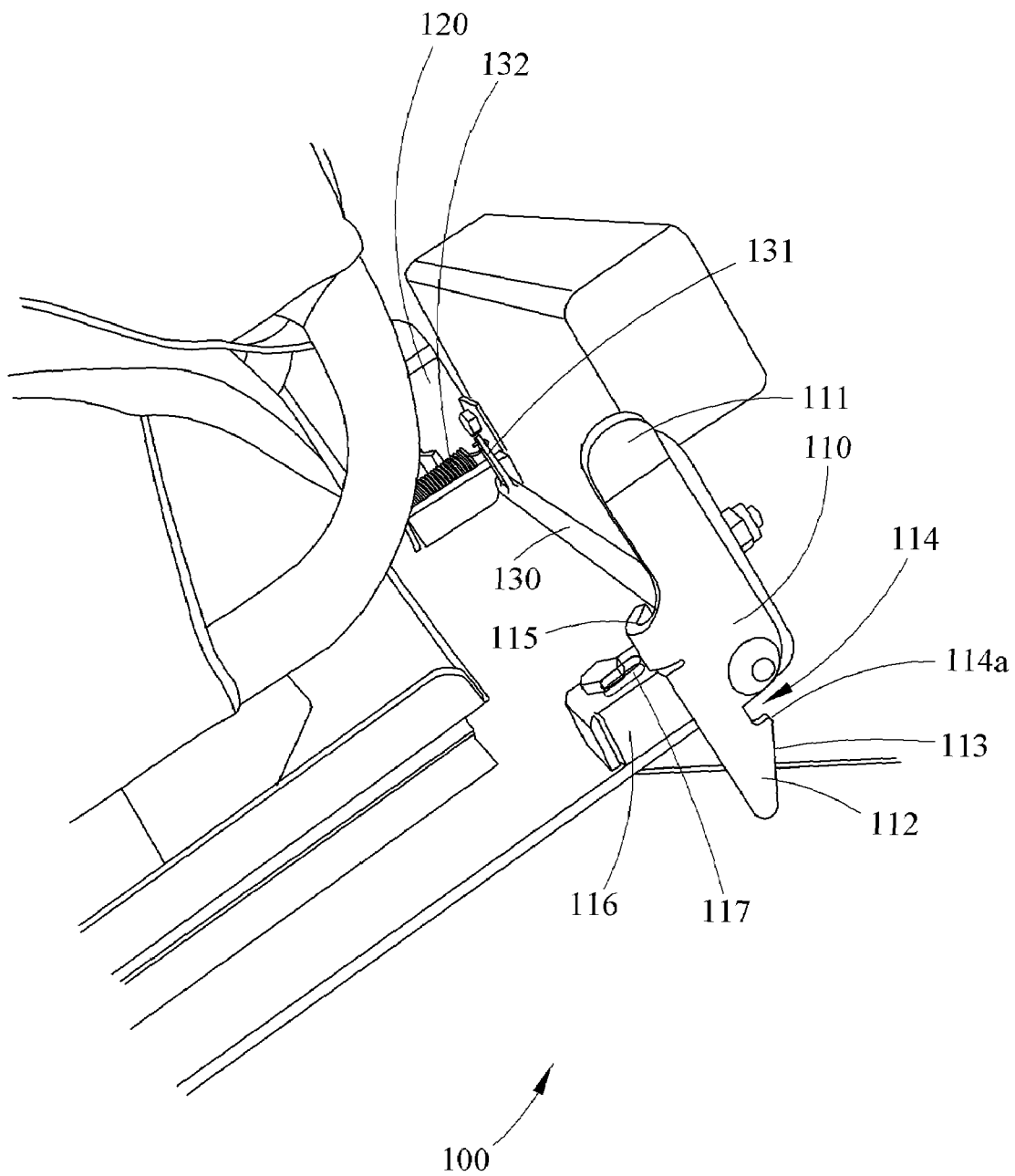
FIG. 32 is a perspective view of an adjustable removable seat latch system according to a preferred embodiment showing the seat in an open position.
Figure 33:
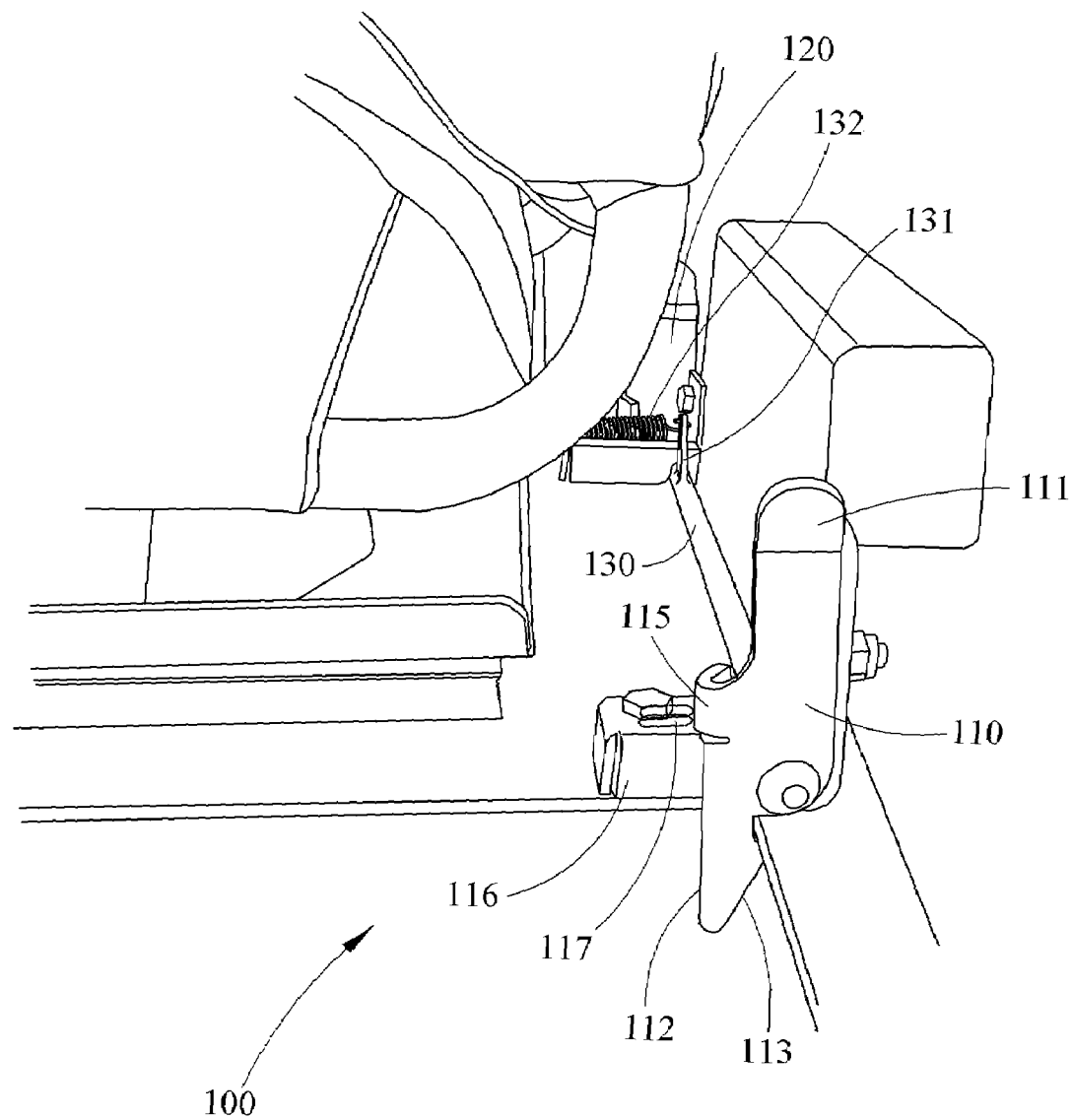
FIG. 33 is a perspective view of an adjustable removable seat latch system shown in FIG. 32 showing the seat in an closed position showing the latch in a locked position.
Figure 34:
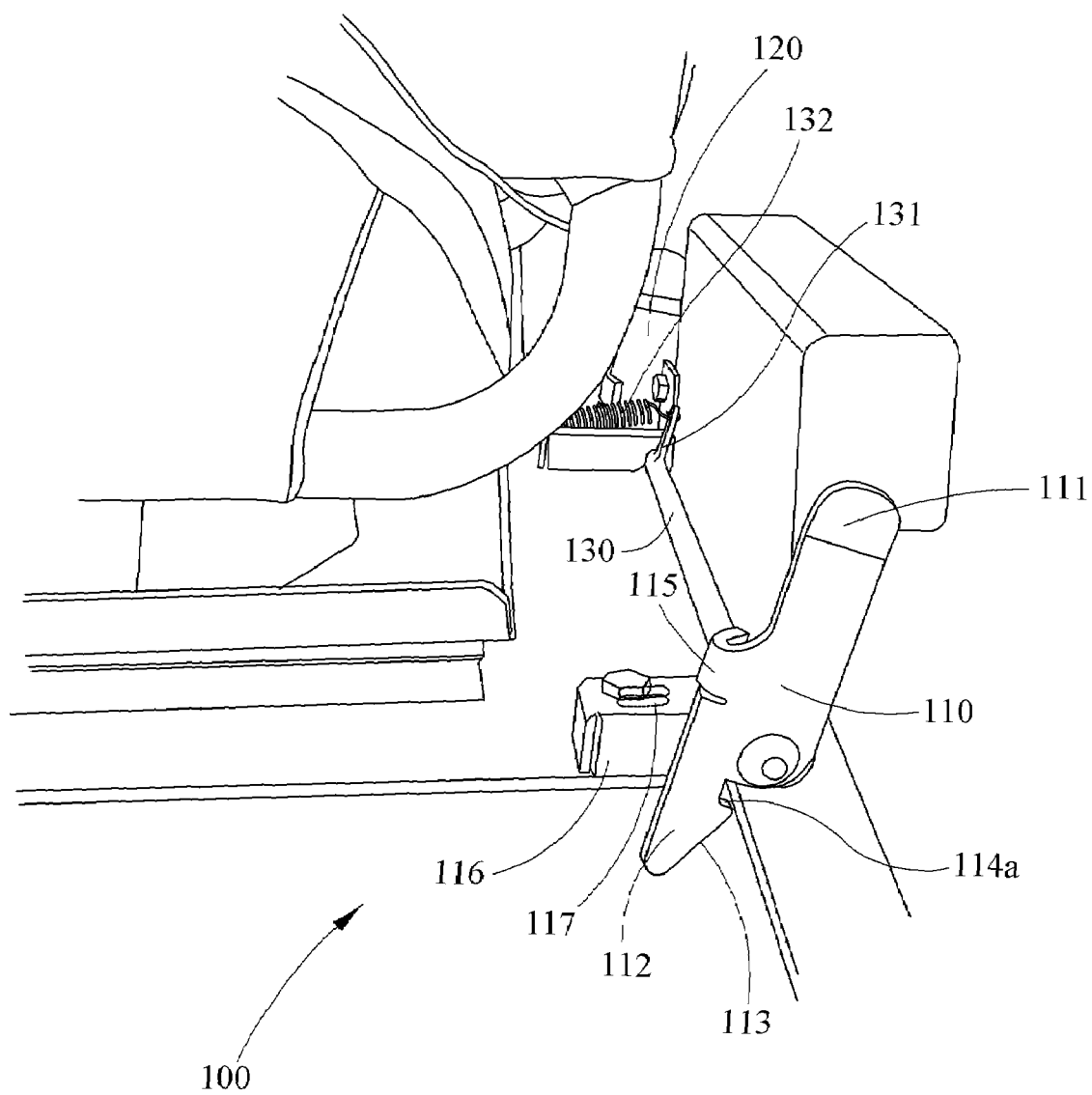
FIG. 34 is a perspective view of an adjustable removable seat latch system shown in FIG. 32 showing the seat in a closed position but showing the latch in an unlocked position.

Optionally, the vehicle 10 can comprise an adjustable removable seat latch system 100 to provide an automatic, positive catch or lock of a seat mount 13a to the frame 11. Referring now to FIGS. 32-34, the preferred adjustable removable seat latch system 100 is described. The adjustable removable seat latch system 100 comprises a first latch 110 and a second latch 120 connected by a shaft 130. In this embodiment the first shaft 110 is identical in all major respects to the second latch 120. The shaft 130 comprises a tab 131 extending therefrom. A spring 132 is connected to the tab 131 and to the frame 11 or the seat mount 13a in order to provide a spring bias in a first closed or locked position. The first latch 110 further comprises a finger activation portion 111 on one end thereof and a catch portion 112 on a second end thereof. The catch portion 112 preferably further comprises an angled section 113 terminating in a groove 114. The first latch 110 further comprises a stop portion 115 disposed between the finger activation portion 111 and the catch portion 112. The first latch 110 preferably further comprises an adjustment block 116 having adjustment holes 117 in both a horizontal plane and a vertical plane. The stop portion 115 preferably abuts the adjustment block 116 when the adjustable removable seat latch system 100 is in the first, closed (latched) position. The spring 132 serves to bias the first latch 110 in the closed position. Preferably the shaft 130 is rotatably disposed within the adjustment block 116.

When the seat 13 is down and in the closed, or locked position (see FIG. 33), the groove 114 surrounds a mating portion of the frame 11. The groove 114 comprises a locking surface 114a that receives a portion of the frame 11. The spring 132 maintains the locking surface 114a of the groove 114 in interlocking relationship with the frame 11 or the seat mount 13a. To open, a user simply presses the finger activation portion 111 which works against the spring 132 to rotate the first latch 110 and the second latch 120 via shaft 130 from a first locked position to a second, unlocked position, wherein a bottom portion of the groove 114 is no longer in interlocking relationship with frame 11 (see FIG. 34). The user can then simply lift the seat 13 to perform maintenance thereunder. Then, when the seat is lowered back into its normal position, the angled section 113 of the first catch 110 and the second catch 120 automatically rides along frame 11, increasingly acting against spring 132 until groove 114 is reached. At this time, spring 132 snaps the catch portion 112 toward frame 11, moving the locking surface 114a of the groove 114 into interlocking relationship with the frame 11. In this way the seat 13 locks automatically, without the user having to engage manually a locking device.

The removable adjustment block 116, with its adjustment holes 117, allow the use to adjust the position of the adjustment block 116 to provide the desired amount of force needed to lock or unlock the adjustable removable seat latch system 100. With its bolted design, the entire adjustable removable seat latch system 100 may be simply and efficiently removed from the seat mount 13a for repair or replacement without the need to remove the entire seat 13 or seat mount 13a.

An embodiment has been shown and described, but variations of the adjustable removable seat latch system 100 are possible without deviating from the invention. For instance, a single seat latch 110 is possible on either side of the seat mount 13a without connection (via shaft 130) to a second seat latch 120. Also, the adjustment block 116 may include multiple holes instead of slotted adjustment holes 117 to provide adjustability. Moreover, the slotted holes or multiple holes may be placed instead in the seat mount 13a to be used with round holes in the adjustment block 116. Furthermore, the adjustment block 116 need not be the device that receives catch portion 112. Rather, catch portion 112 could just as easily be received by a portion of the seat mount 13a or the frame 11, depending on design of the vehicle 10. Moreover, the groove 114 could interlock with the frame 11, the seat mount 13a, or any sturdy feature of the vehicle 10, depending on the specific designs employed. Regardless of these variations, the adjustable removable seat latch system 100 provides a safe, reliable, automatic, removable, adjustable seat latch system that provides a positive latch required in ROPS systems, without the need for the user to remember to activate a safety latch.

Figure 35:
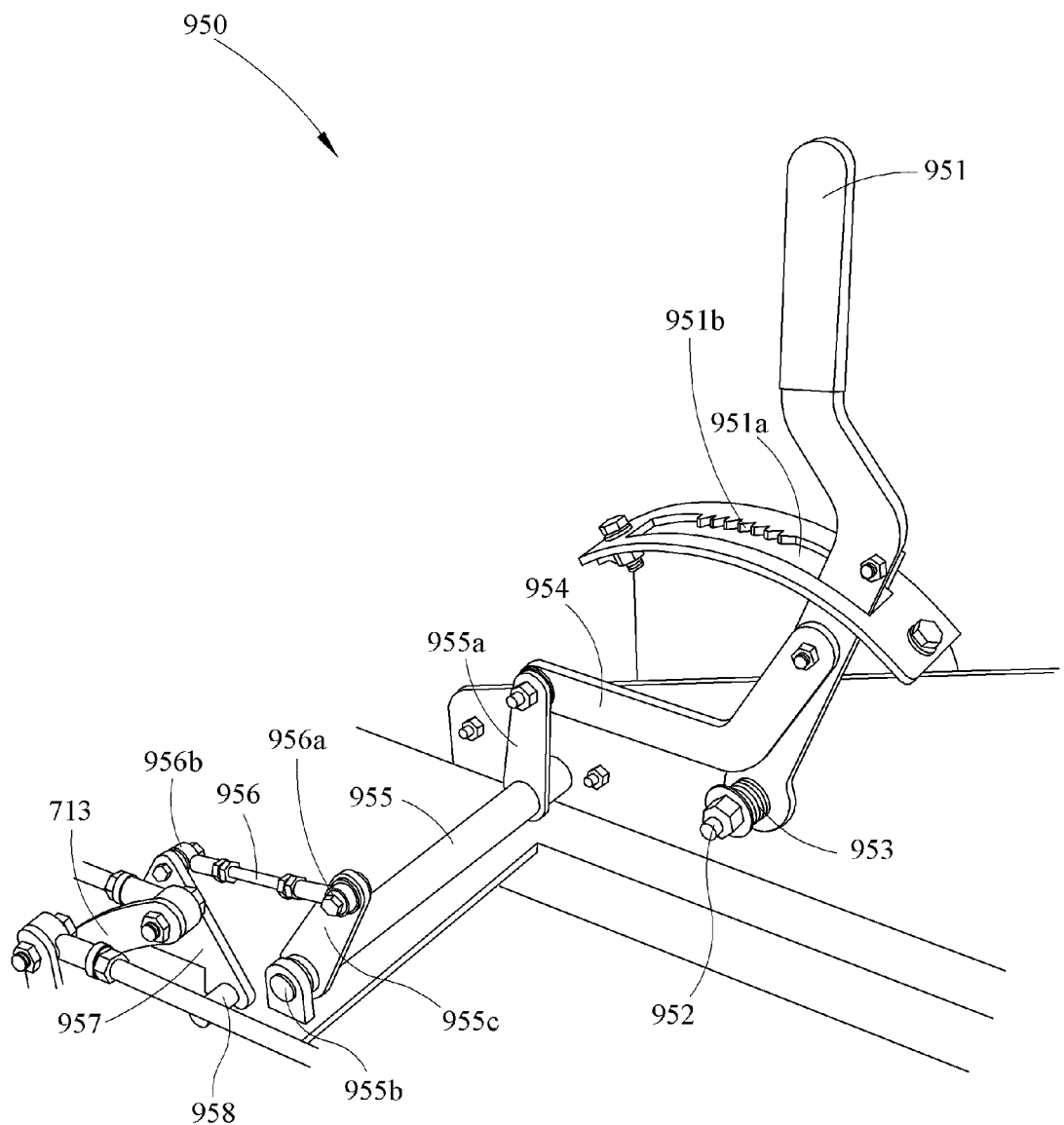
FIG. 35 is a left perspective view of a cruise control system according to a preferred embodiment.
Figure 36:
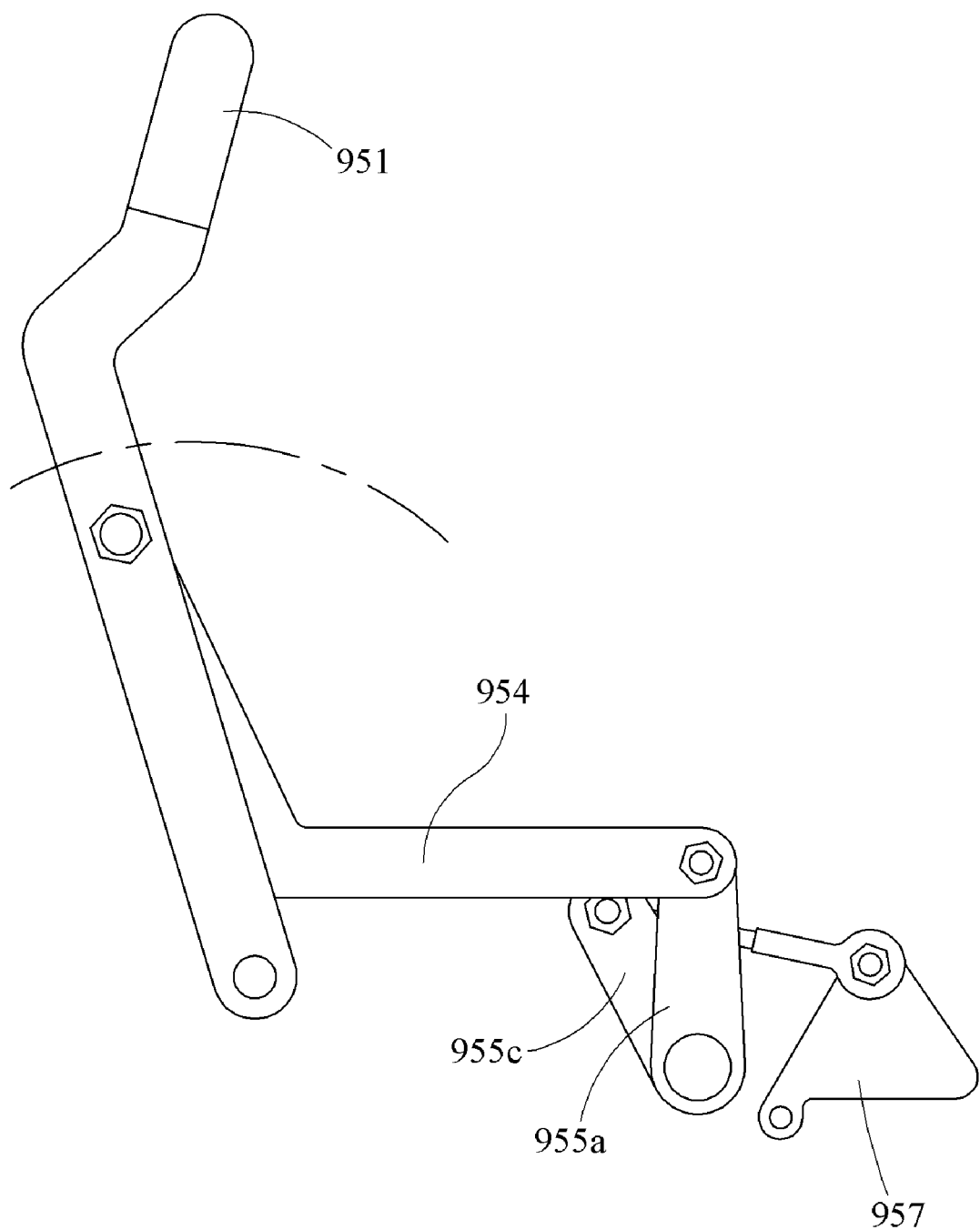
FIG. 36 is a right side view of the cruise control system of FIG. 35.

Optionally, the vehicle 10 comprises a cruise control system 950 to allow the operator to remove his/her foot from the forward pedal 71 while still maintaining a constant forward speed. Referring to FIGS. 35 and 36, the cruise control system 950 of this embodiment comprises a handle 951 rotatably connected to the frame 11 at a pivot 952. The pivot 952 preferably comprises a spring 953 to bias the handle 951 in an engaged position.

The handle 951 comprises an arm 954 connected to a cruise control shaft 955 that is rotatably connected to the frame 11. The cruise control shaft 955 has a first end 955a and a second end 955b. The first end 955a is connected to the arm 954. A first cruise control link 956, having a first end 956a and a second end 956b, is connected at its first end 956a to the second end 955b of the cruise control shaft 955 via arm 955c. The second end 956b of the first cruise control link 956 is connected to a forward control arm 957 that is rotatably connected to the forward control shaft 712. The forward control arm 957 further comprises an engagement tab 958 extending outwardly therefrom. The engagement tab 958 engages the arm 713 at the first forward link 711.

The handle 951 is moveable within a slot 951a. Notches 951b are located within the slot 951a. When a user pushes handle 951 forward, this rotates cruise control shaft 955 forward, thereby moving first cruise control link 956 forward. Forward control arm 957 then moves engagement tab 958 into engagement with arm 713 of forward control shaft 712. Further movement of handle 951 then rotates forward control shaft 712 forward. Because first forward link 711 is now being moved forward, this translates into forward movement of the vehicle 10. Additional movement of handle 951 translates into increased ground speed of the vehicle 10. Spring loaded pivot 952 biases handle 951 into notches 951b within slot 951a. The user is then able to select the desired ground speed of the vehicle 10 and allow the handle 951 to reside in an appropriate notch 951b. In this manner the user is operating in cruise control and can remove his foot from forward pedal 71.

As stated above, and with reference again to FIGS. 1 and 4, the present invention optionally may be adapted for use as a lawn mower. To that end, a mowing deck 14 may be attached to frame 11 comprising one or more cutting blades 15 for use in cutting grass. The mowing deck 14 may be any type of cutting deck known in the art for use with a lawn mower, however the present invention is particularly suited for use with a mowing deck 14 comprising counter-rotating blades 15. Further, each cutting blade 15 may rotate within its own individual blade chamber 16 during operation. The cutting blades 15 counter-rotate in that one or more of the blades rotates in the clockwise direction during operation while one or more of the other blades rotates in the counterclockwise direction. The paths of these counter-rotating blades 15 may overlap, with the blade chambers 16 having an opening in such area to allow for the overlapping. The mowing deck 14 may include an exit chute 17 to allow the grass clippings to exit the mowing deck 14 after cutting. The exit chute 17 may be placed at a variety of locations on the apparatus 10, such as on the left or right side of the mowing deck 14 or at the rear of the apparatus 10, among others. Further, the blade chambers 16 may include enclosures in which grass clippings are kept after cutting in order to prevent them from exiting the mowing deck 14 area and littering the lawn.

Figure 37:
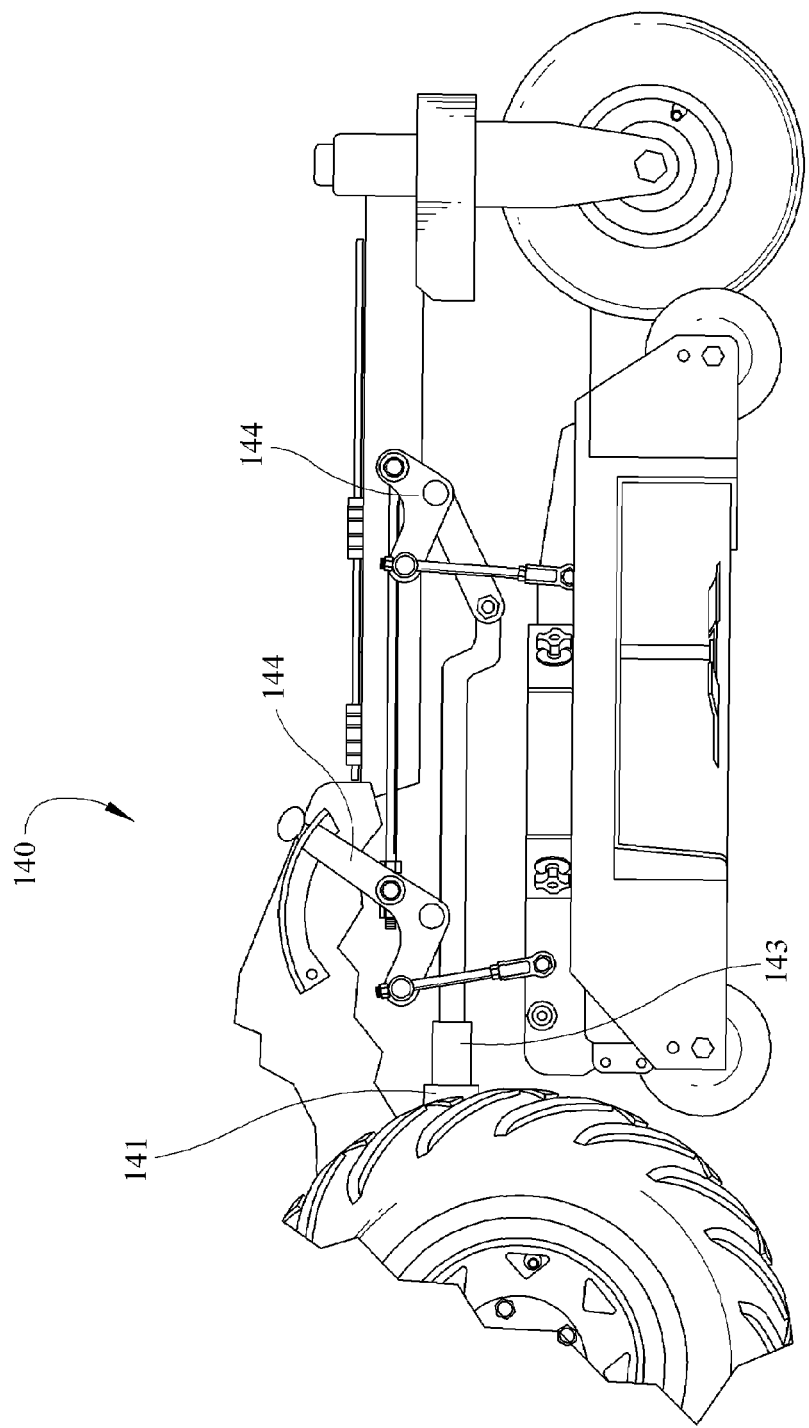
FIG. 37 is a side view of an automatic height adjustment means for a mowing deck according to a preferred embodiment.

Optionally the vehicle 10 may comprise an automatic height adjustment means 140 for the mowing deck 14. Referring now to FIG. 37, in this embodiment the automatic height adjustment means 140 comprises a motor 141 electrically connected to a switch 142 mounted in a convenient location on the control panel 18 for the user. The motor 141 comprises a movable actuator 143. The actuator 143 is connected to various height adjustment linkages 144 that translate the linear motion of the actuator 143 into vertical height adjustment of the mowing deck 14, keeping the mowing deck 14 level during its travel. In the preferred embodiment, the motor 141 is a linear actuator such as manufactured by Dollinger.

While there has been described and illustrated particular embodiments of a novel ZTR vehicle with steerable front wheels and a multistage steering system, it will be apparent to those skilled in the art that variations and modifications may be possible without deviating from the broad spirit and principle of the present invention, which shall be limited solely by the scope of the claims appended hereto.

What is claimed is:

1. In a vehicle having at least one steerable front wheel and first and second independent drive wheels, a steering assembly comprising:
   (a) a steering column rotatably mounted on said vehicle for receiving input from a steering device, said steering column coupled to said at least one steerable front wheel, and further comprising at least one steering cam having a camming surface thereon,
   (b) an engagement cam pivotably mounted to said vehicle and selectively coupled to said steering input to provide staged acceleration or deceleration input to said first and second independent drive wheels; and
   (c) wherein, in a first position, said engagement cam alters a rotational speed of at least one of said first and second independent drive wheels and wherein, in a second position said engagement cam does not alter said rotational speed of said first and second independent drive wheels.

2. The steering assembly of claim 1 wherein said first and second drive wheels are separately adjustably driven by rotation of said steering column in a first direction and separately adjustably driven by rotation of said steering column in a second direction.

3. The steering assembly of claim 1 wherein said staged input comprises a first stage steering input of a first magnitude resulting from said steering device and an additional second stage steering input of a second magnitude resulting from said engagement cam.

4. The steering assembly of claim 3 wherein said first stage steering input is transferred from said steering device to said at least one steerable front wheel via an oblongated sprocket.

5. The steering assembly of claim 3 wherein said second stage steering input is transferred from said steering device to said first and second independent drive wheels via said engagement cam.

6. In a vehicle comprising first and second steerable front wheels and first and second drive wheels, a two-stage steering assembly comprising:
   (a) at least one oblongated sprocket coupling said first and second steerable front wheels to a steering input device to provide a first stage steering input; and
   (b) an angled engagement cam rotatably mounted to an engagement cam shaft for providing drive input to said first and second drive wheels only after a predetermined amount of steering input has been made; and
   (c) wherein in a first position, said engagement cam provides drive input to at least one of said first and second drive wheels, and in a second position said engagement cam does not provide drive input to at least one of said first and second drive wheels.

7. The two-stage steering assembly of claim 6 wherein no drive input to said first and second drive wheels occurs when said steering input is less than said predetermined amount of steering input.

8. The two-stage steering assembly of claim 6 wherein drive input to said first and second drive wheels does occur when said steering input is greater than or equal to said predetermined amount of steering input.

9. A two-stage steering assembly for a vehicle having at least one steerable front wheel operatively coupled to a steering input and at least two independently driven drive wheels, wherein said two-stage steering assembly comprises:
   at least one steering cam operatively coupled to said steering input, wherein said at least one steering cam further comprises a surface for selectively coupling with at least one cam follower, wherein said at least one cam follower is coupled with said at least two independently driven drive wheels for providing unequal locomotive power to said at least two independently driven drive wheels;
   at least one oblongated wheel sprocket operatively connected to said steering input and to said at least one steerable front wheel for translating said steering input into a steering direction of said at least one steerable front wheel
   wherein, in a first position, said at least one steering cam contacts said at least one cam follower and provides unequal locomotive power to said at least two independently driven drive wheels, and in a second position, said at least one steering cam contacts said at least one cam follower and does not provide unequal locomotive power to said at least two independently driven drive wheels.

10. The two-stage steering assembly of claim 9 wherein said at least one steering cam further comprises an exterior surface that is at least in part noncircular.

11. The two-stage steering assembly of claim 10 further comprising an engagement cam rotatably coupled to said vehicle.

12. The two-stage steering assembly of claim 11 wherein said engagement cam activates said at least one cam follower only after a predetermined amount of drive input.

13. In a vehicle having independently driven drive wheels, a method for separating a steering input into a front wheel steering system and a drive wheel bias system, said method comprising:

providing at least one oblongated wheel sprocket operatively connecting said steering input to at least one steerable front wheel;

providing at least one steering cam that, in a first position, couples said steering input to a pump mechanism of said drive wheel bias system to provide bias to said independently driven drive wheels of said vehicle via a forward input for delivering forward locomotive power to said drive wheel bias system; and in a second position does not couple said steering input to a pump mechanism of said drive wheel bias system to provide bias to said independently driven drive wheels of said vehicle via a forward input for delivering forward locomotive power to said drive wheel bias system.

14. The method of claim 13 wherein said at least one steering cam further comprises an exterior surface that is at least in part noncircular.

15. The method of claim 14 further comprising at least one cam follower to selectively engage said exterior surface of said at least one steering cam.

* * * * *